(12) United States Patent
Sun et al.

(10) Patent No.: US 9,300,009 B2
(45) Date of Patent: Mar. 29, 2016

(54) ELECTROLYTE COMPOSITIONS FOR LITHIUM ION BATTERIES

(71) Applicant: UT-Battelle, LLC, Oak Ridge, TN (US)

(72) Inventors: Xiao-Guang Sun, Knoxville, TN (US); Sheng Dai, Knoxville, TN (US); Chen Liao, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 500 days.

(21) Appl. No.: 13/657,304

(22) Filed: Oct. 22, 2012

(65) Prior Publication Data

US 2014/0113202 A1 Apr. 24, 2014

(51) Int. Cl.
  H01M 10/052 (2010.01)
  H01M 10/0567 (2010.01)
  H01M 10/0568 (2010.01)
  H01M 10/0569 (2010.01)

(52) U.S. Cl.
  CPC ........ *H01M 10/052* (2013.01); *H01M 10/0567* (2013.01); *H01M 10/0568* (2013.01); *H01M 10/0569* (2013.01); *H01M 2300/0045* (2013.01); *Y02E 60/122* (2013.01); *Y02T 10/7011* (2013.01)

(58) Field of Classification Search
  None
  See application file for complete search history.

(56) References Cited

U.S. PATENT DOCUMENTS

| | | | |
|---|---|---|---|
| 4,118,550 A | 10/1978 | Koch | |
| 7,060,818 B2 | 6/2006 | Horwitz et al. | |
| 7,205,073 B2 | 4/2007 | Kim et al. | |
| 7,425,388 B2 | 9/2008 | Park et al. | |
| 8,129,543 B2 | 3/2012 | Kawada et al. | |
| 8,252,438 B2 | 8/2012 | Han et al. | |
| 2004/0048163 A1 | 3/2004 | Park et al. | |
| 2006/0068297 A1 | 3/2006 | Tan et al. | |
| 2008/0118845 A1* | 5/2008 | Ihara et al. | 429/338 |
| 2010/0209783 A1* | 8/2010 | Siret et al. | 429/338 |
| 2014/0011720 A1* | 1/2014 | Antzutkin | C10M 105/78 508/198 |

FOREIGN PATENT DOCUMENTS

WO  WO 02/068433 A1  9/2002
WO  WO 2012/128714  *  9/2012

OTHER PUBLICATIONS

STIC Search Results Apr. 29, 2015.*
Sun X.G. et al., "Synthesis and Characterization of Ionic Liquid for Lithium-Ion Batteries", *The Electrochemical Society, Pacific Rim Meeting on Electrochemical and Solid-State Science (PRIME* 2012) (Oct. 7-12, 2012).
Zhang Z., "Advanced Electrolyte Additives for PHEV/EV Lithium-Ion Battery", *Argonne National Laboratory, Vehicle Technologies Program, Washington, D.C.* (May 14-18, 2012).
Shao N. et al., "Electrochemical Windows of Sulfone-Based Electrolytes for High-Voltage Li-Ion Batteries", *The Journal of Physical Chemistry B* 115:12120-12125 (2011).
Von Cresce A. et al., "Electrolyte Additive in Support of 5 V Li Ion Chemistry", *Journal of the Electrochemical Society* 158(3):A337-A342 (2011).
Bogdanov M.G. et al., "New Guanidinium-Based Room-Temperature Ionic Liquids. Substituent and Anion Effect on Density and Solubility in Water", *Z. Naturforsch* 65b:37-48 (2010).
Sun X-G et al., "Electrochemical Investigations of Ionic Liquids with Vinylene Carbonate for Applications in Rechargeable Lithium Ion Batteries", *Electrochimica Acta* 55:4618-4626 (2010).
El Ouatani L. et al., "Effect of Vinylene Carbonate Additive in Li-Ion Batteries: Comparison of LiCoO$_2$/C, LiFePO$_4$/C, and LiCoO$_2$/Li$_4$Ti$_5$O$_{12}$ Systems", *Journal of the Electrochemical Society* 156(6):A468-A477 (2009).
Schreiner C. et al., "Chloride-Free Method to Synthesise New Ionic Liquids with Mixed Borate Anions", *Chemistry A European Journal* 15:2270-2272 (2009).
Yao W. et al., "Vinyl Ethylene Sulfite as a New Additive in Propylene Carbonate-Based Electrolyte for Lithium Ion Batteries", *Energy & Environmental Science* 2:1102-1108 (2009).
Sun X-G et al., "Ether Sulfones with Additive for Electrolytes in Rechargeable Lithium Ion Batteries", 213$^{th}$ ECS Meeting May 18-May 22, 2008 Phoenix, AZ, B1-Batteries General Session, Abstract 162.
Sun X-G et al., "Synthesis and Characterization of Network Type Single Ion Conductors", *Macromolecules* 37:2219-2227 (2004).

(Continued)

*Primary Examiner* — Sarah A Slifka
(74) *Attorney, Agent, or Firm* — Scully, Scott, Murphy & Presser, P.C.

(57) ABSTRACT

The invention is directed in a first aspect to an ionic liquid of the general formula $Y^+Z^-$, wherein $Y^+$ is a positively-charged component of the ionic liquid and $Z^-$ is a negatively-charged component of the ionic liquid, wherein $Z^-$ is a boron-containing anion of the following formula:

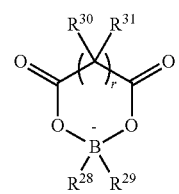

The invention is also directed to electrolyte compositions in which the boron-containing ionic liquid $Y^+Z^-$ is incorporated into a lithium ion battery electrolyte, with or without admixture with another ionic liquid $Y^+X^-$ and/or non-ionic solvent and/or non-ionic solvent additive.

12 Claims, 14 Drawing Sheets

(56) References Cited

OTHER PUBLICATIONS

Xu K. et al., "Sulfone-Based Electrolytes for Lithium-Ion Batteries", *Journal of the Electrochemical Society* 149(7):A920-A926 (2002).

Barthel J. et al., "A New Class of Electrochemically and Thermally Stable Lithium Salts for Lithium Battery Electrolytes", *J Electrochm. Soc.* 143(11):3572-3575 (Nov. 1996).

* cited by examiner

ELECTROLYTE COMPOSITIONS FOR LITHIUM ION BATTERIES

This invention was made with government support under Prime Contract No. DE-AC05-00OR22725 awarded by the U.S. Department of Energy. The government has certain rights in the invention.

FIELD OF THE INVENTION

The present invention relates generally to electrolyte compositions for lithium ion batteries, and more particularly, to such electrolyte compositions containing ionic liquids.

BACKGROUND OF THE INVENTION

Lithium ion batteries (LIBs) are widely used in consumer electronics, such as laptop computers, camcorders, cameras, and cell phones, and are now being considered for applications in electric vehicles. With pressing worldwide environmental concerns, lithium ion batteries have been actively proposed for applications in electric vehicle (EV), hybrid electric vehicle (HEV) and plug-in hybrid-electric vehicles (PHEVs). However, their use has been largely obviated due to safety concerns related to the volatile liquid organic electrolytes used in these batteries. The volatile electrolytes are prone to local overheating, with the possibility of fire or explosion, particularly in the event of a short circuit or structural damage. Ionic liquids, which are known for their non-flammability, high electrochemical stability and negligible vapor pressure, are good candidates for tackling the safety issues in lithium ion batteries.

Much work has been directed to testing ionic liquids as safer electrolytes for lithium ion batteries. As a routinely studied example of ionic liquid, 1-ethyl-3-methylimidazolium bis(trifluoromethanesulfonyl)imide (EMI.TFSI) has the advantages of low viscosity and high ionic conductivity. However, EMI.TFSI has a very poor electrochemical window, particularly its relative high reduction potential of 1.0V versus Li/Li+, which is too positive to allow lithium deposition or intercalation. For this reason, EMI.TFSI is not suitable for lithium ion batteries. Ionic liquids containing saturated quaternary ammoniums are more resistant toward oxidation and reduction than the imidazolium cation, and thus, they generally have much larger electrochemical window than the corresponding imidazolium compounds. However, they and other ionic liquids have relatively poor capability in forming an efficient solid electrolyte interphase (SEI), which results in continual reaction and losing capacity with cycling.

Graphite has been routinely used as standard anode material in commercial LIBs because of its low cost, low lithium intercalation potential, and good cycling stability. To be functional in LIBs, the graphite electrode surface has to be passivated via electrolyte decomposition to form a good thin layer of solid electrolyte interphase (SEI) that prevents continual electrolyte decomposition during the following cycles. For the sole SEI purpose, ethylene carbonate (EC) has become an indispensable component in the mixed carbonate electrolytes used in commercial LIBs. Unfortunately, EC has a high melting point of 37° C., which limits the low-temperature performance of LIBs, even with a combination of linear carbonates. By contrast, propylene carbonate (PC), with a similar cyclic structure as EC, has a much lower melting point of −49° C., and thus, offers many advantages over the carbonate mixtures, particularly with regard to low-temperature performance. However, PC by itself is not compatible with the graphite electrode since it is known to co-intercalate with lithium ions into graphene layers, thereby causing exfoliation of the graphite. In an effort to improve the compatibility of PC with graphite electrode, additives such as vinylene carbonate, vinyl ethylene carbonate (VEC), vinyl ethylene sulfite (VES), butylene carbonate (BC), 2-phenylimidazole, and others, have been incorporated into the electrolyte.

On the cathode side of LIBs, either pure or doped $LiCoO_2$ (or $LiMnO_4$) are used in the commercial cells. Recently, with an effort to increase the energy density of the LIBs, 5.0V cathodes, such as $LiNi_{0.5}Mn_{1.5}O_4$, $LiNi_xCo_{1-x}PO_4$, and $LiCu_xMn_{2-x}O_4$, have been successfully developed (Cresce, A. V., et al., *Journal of the Electrochemical Society*, 2011, 158, A337-A342). However, the electrolytes used for these 5.0V cathodes are still based on carbonate mixtures, which have electrochemical stability window below 4.5V. In these mismatched cells the SEI layer on the 5.0V cathode surface is relied upon to stop the continual electrolyte decomposition to make the battery function. Unavoidably, the battery usually exhibits poor cycling stability and high polarization due to the high resistive SEI layer formed on the cathode surface. On the other hand, there are two kinds of electrolytes, namely alkyl sulfones and ionic liquids, which exhibit high oxidative stability (well above 5.5V versus Li/Li+) to match that of 5.0V cathode. However, unfortunately, these electrolytes suffer from high viscosity and poor compatibility with graphite electrode.

SUMMARY OF THE INVENTION

In one aspect, the invention is directed to an ionic liquid of the general formula $Y^+Z^-$, wherein $Y^+$ is a positively-charged component of the ionic liquid and $Z^-$ is a negatively-charged component of the ionic liquid, wherein $Z^-$ has a composition of the following formula:

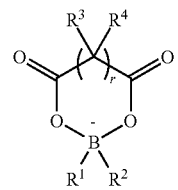

(1)

In Formula (1), $R^1$, $R^2$, $R^3$, and $R^4$ are independently selected from H, F, hydrocarbon groups R containing at least one and up to six carbon atoms and attaching to the shown boron atom by a carbon atom, and alkoxy groups —OR, wherein the hydrocarbon group R is unsubstituted or is substituted with one or more heteroatoms selected from O, N, and S, wherein $R^1$ and $R^2$ can optionally interconnect to form a boron-containing ring, and the subscript r is 0 or 1.

In other aspects, the invention is directed to electrolyte compositions in which the boron-containing ionic liquid of Formula (1) is incorporated, typically as an additive. As the solvent (matrix), the electrolyte composition can include an ionic liquid outside of the Formula (1), i.e., of the general formula $Y^+X^-$, wherein $Y^+$ is a positively-charged component of the ionic liquid and $X^-$ is a negatively-charged component of the ionic liquid. The matrix may also include a non-ionic solvent, such as a sulfone or carbonate solvent, which may or may not be admixed with an ionic liquid $Y^+X^-$. The invention is also directed to electrolyte compositions in which an ionic liquid of the general formula $Y^+X^-$ or $Y^+Z^-$ is admixed with a non-ionic solvent additive, such as vinylene carbonate (VC). In particular embodiments, two ionic liquids, methyl propyl pyrrolidinium bis(trifluoromethanesulfonyl)imide (MPPY.TFSI) and methyl propyl piperidinium bis(trifluoromethanesulfonyl)imide (MPPI.TFSI) are particularly considered for use in combination with a non-ionic solvent additive, such as VC. When ultimately used in a lithium ion battery, the electrolytes should also contain a lithium salt.

In yet other aspects, the invention is directed to lithium ion batteries in which any of the above ionic liquid compositions or electrolyte compositions are incorporated. The invention is also directed to the operation of a lithium ion battery in which any of the above ionic liquid compositions or electrolyte compositions are incorporated.

DETAILED DESCRIPTION OF THE INVENTION

Figure 1:
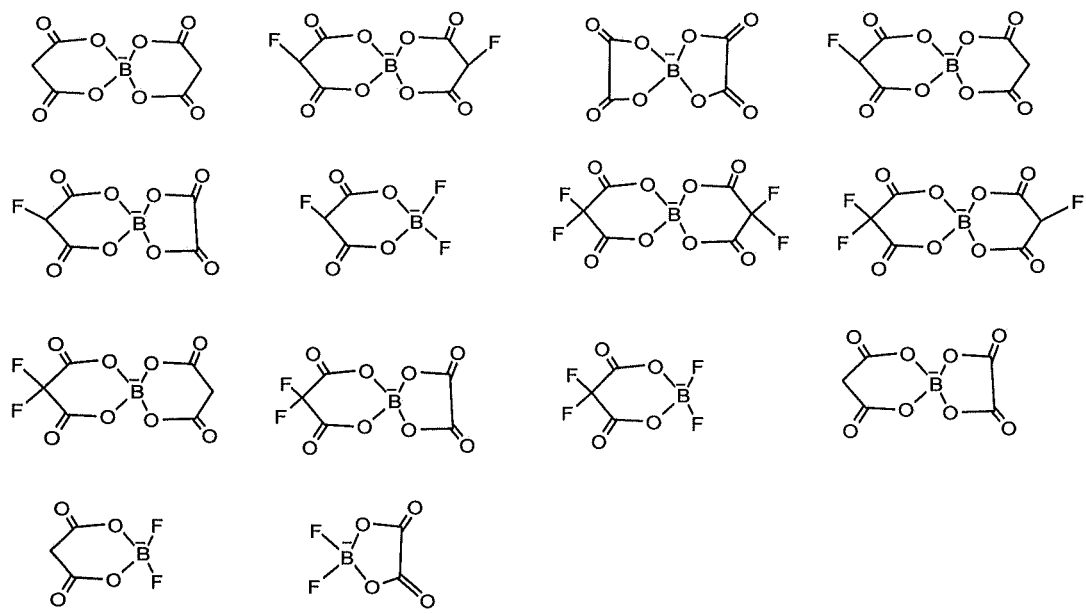
FIG. 1. Structures of selected boron-containing anions ($Z^-$) of particular consideration for ionic liquids ($Y^+Z^-$) considered herein.

As used herein, the term "about" generally indicates within ±0.5%, 1%, 2%, 5%, or up to ±10% of the indicated value. For example, an amount of about 10 wt % generally indicates in its broadest sense 10 wt %±10%, which indicates 9.0-11.0 wt %. The term "about" may alternatively indicate either a measurement error (i.e., by limitations in the measurement method) or a variation or average in a physical characteristic of a group (e.g., a distribution of pores).

The term "hydrocarbon group" or "hydrocarbon linker" (also identified as "R"), as used herein, designates, in a first embodiment, groups or linkers composed solely of carbon and hydrogen. In different embodiments, one or more of the hydrocarbon groups or linkers can contain precisely, or a minimum of, or a maximum of, for example, one, two, three, four, five, six, seven, eight, nine, ten, eleven, or twelve carbon atoms, or a number of carbon atoms within a particular range bounded by any two of the foregoing carbon numbers. Hydrocarbon groups or linkers in different compounds described herein, or in different positions of a compound, may possess the same or different number (or preferred range thereof) of carbon atoms in order to independently adjust or optimize the activity or other characteristics of the compound.

The hydrocarbon groups or linkers can be, for example, saturated and straight-chained (i.e., straight-chained alkyl groups or alkylene linkers). Some examples of straight-chained alkyl groups (or alkylene linkers) include methyl (or methylene linker, i.e., —$CH_2$—, or methine linker), ethyl (or ethylene or dimethylene linker, i.e., —$CH_2CH_2$— linker), n-propyl, n-butyl, n-pentyl, n-hexyl, n-heptyl, n-octyl, n-nonyl, n-decyl, n-undecyl, and n-dodecyl groups (or their respective linker analogs).

The hydrocarbon groups or linkers can alternatively be saturated and branched (i.e., branched alkyl groups or alkylene linkers). Some examples of branched alkyl groups include isopropyl, isobutyl, sec-butyl, t-butyl, isopentyl, neopentyl, 2-methylpentyl, and 3-methylpentyl. Some examples of branched alkylene linkers are those derived by removal of a hydrogen atom from one of the foregoing exemplary branched alkyl groups (e.g., isopropylene, —$CH(CH_3)CH_2$—).

The hydrocarbon groups or linkers can alternatively be saturated and cyclic (i.e., cycloalkyl groups or cycloalkylene linkers). Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane). Some examples of cycloalkylene linkers are those derived by removal of a hydrogen atom from one of the foregoing exemplary cycloalkyl groups.

The hydrocarbon groups or linkers can alternatively be unsaturated and straight-chained (i.e., straight-chained olefinic or alkenyl groups or linkers). The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl ($CH_2$=CH—$CH_2$—), 2-buten-1-yl ($CH_2$—CH=CH—$CH_2$—), butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, and propargyl (2-propynyl). Some examples of straight-chained olefinic linkers are those derived by removal of a hydrogen atom from one of the foregoing exemplary straight-chained olefinic groups (e.g., vinylene, —CH=CH—, or vinylidene).

The hydrocarbon groups or linkers can alternatively be unsaturated and branched (i.e., branched olefinic or alkenyl groups or linkers). Some examples of branched olefinic groups include propen-2-yl, 3-buten-2-yl ($CH_2$=CH—CH.—$CH_3$), 3-buten-3-yl ($CH_2$=C.—$CH_2$—$CH_3$), 4-penten-2-yl, 4-penten-3-yl, 3-penten-2-yl, 3-penten-3-yl, and 2,4-pentadien-3-yl. Some examples of branched olefinic linkers are those derived by removal of a hydrogen atom from one of the foregoing exemplary branched olefinic groups.

The hydrocarbon groups or linkers can alternatively be unsaturated and cyclic (i.e., cycloalkenyl groups or cycloalkenylene linkers). The unsaturated and cylic group can be aromatic or aliphatic. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene. Some examples of cycloalkenylene linkers are those derived by removal of a hydrogen atom from one of the foregoing exemplary cycloalkenyl groups (e.g., phenylene and biphenylene).

One or more of the hydrocarbon groups or linkers may also include one or more heteroatoms (i.e., non-carbon and non-hydrogen atoms), such as one or more heteroatoms selected from oxygen, nitrogen, sulfur, and halide atoms, as well as groups containing one or more of these heteroatoms (i.e., heteroatom-containing groups). Some examples of oxygen-containing groups include hydroxy (OH), carbonyl-containing (e.g., carboxylic acid, ketone, aldehyde, carboxylic ester, amide, and urea functionalities), nitro ($NO_2$), carbon-oxygen-carbon (ether, or alkoxy group OR), sulfonyl, and sulfinyl (i.e., sulfoxide) groups. The ether group can also be a polyalkyleneoxide group, such as a polyethyleneoxide group. Some examples of nitrogen-containing groups include primary amine, secondary amine, tertiary amine, cyanide (i.e., nitrile), amide (i.e., —C(O)$NR_2$ or —NRC(O), wherein R is independently selected from hydrogen atom and hydrocarbon group, as described above), nitro, urea, imino, and carbamate. Some examples of sulfur-containing groups include mercapto (i.e., —SH), thioether (i.e., sulfide), disulfide, sulfoxide, sulfone, sulfonate, and sulfate groups. Some examples of halide atoms considered herein include fluorine, chlorine, and bromine. One or more of the heteroatoms described above (e.g., oxygen, nitrogen, and/or sulfur atoms) can be inserted between carbon atoms (e.g., as —O—, —NR—, or —S—) in any of the hydrocarbon groups described above to form a heteroatom-substituted hydrocarbon group or linker. Alternatively, or in addition, one or more of the heteroatom-containing groups can replace one or more hydrogen atoms on the hydrocarbon group or linker. Some particular examples of alkoxy groups —OR include methoxy, ethoxy, n-propoxy, isopropoxy, n-butoxy, isobutoxy, t-butoxy, phenoxy, benzyloxy, 2-hydroxyethoxy, 2-methoxyethoxy, 2-ethoxyethoxy, vinyloxy, and allyloxy groups.

In embodiments where the hydrocarbon group is or includes a cyclic group, the cyclic group may be, for example, monocyclic by containing a single ring without connection or fusion to another ring. The cyclic hydrocarbon group may alternatively be, for example, bicyclic, tricyclic, tetracyclic, or a higher polycyclic ring system by having at least two rings interconnected (i.e., by a bond) and/or fused.

In some embodiments, the cyclic hydrocarbon group is carbocyclic, i.e., does not contain ring heteroatoms (i.e., only ring carbon atoms). In different embodiments, ring carbon atoms in the carbocyclic group are all saturated, or a portion of the ring carbon atoms are unsaturated, or the ring carbon atoms are all unsaturated (as found in aromatic carbocyclic groups, which may be monocyclic, bicyclic, tricylic, or higher polycyclic aromatic groups).

In some embodiments, the hydrocarbon group is, or includes, a cyclic or polycyclic group that includes at least one ring heteroatom (for example, one, two, three, four, or higher number of heteroatoms). Such ring heteroatom-substituted cyclic groups are referred to herein as "heterocyclic groups". As used herein, a "ring heteroatom" is an atom other than carbon and hydrogen (typically, selected from nitrogen, oxygen, and sulfur) that is inserted into, or replaces a ring carbon atom in, a hydrocarbon ring structure. In some embodiments, the heterocyclic group is saturated, while in other embodiments, the heterocyclic group is unsaturated (i.e., aliphatic or aromatic heterocyclic groups, wherein the aromatic heterocyclic group is also referred to herein as a "heteroaromatic ring", or a "heteroaromatic fused-ring system" in the case of at least two fused rings, at least one of which contains at least one ring heteroatom). In some embodiments, the heterocyclic group is bound via one of its ring carbon atoms to another group (i.e., other than hydrogen atom and adjacent ring atoms), while the one or more ring heteroatoms are not bound to another group. In other embodiments, the heterocyclic group is bound via one of its heteroatoms to another group, while ring carbon atoms may or may not be bound to another group.

Some examples of saturated heterocyclic groups include those containing at least one oxygen atom (e.g., oxetane, tetrahydrofuran, tetrahydropyran, 1,4-dioxane, 1,3-dioxane, and 1,3-dioxepane rings), those containing at least one nitrogen atom (e.g., pyrrolidine, piperidine, piperazine, imidazolidine, azepane, and decahydroquinoline rings), those containing at least one sulfur atom (e.g., tetrahydrothiophene, tetrahydrothiopyran, 1,4-dithiane, 1,3-dithiane, and 1,3-dithiolane rings), those containing at least one oxygen atom and at least one nitrogen atom (e.g., morpholine and oxazolidine rings), those containing at least one oxygen atom and at least one sulfur atom (e.g., 1,4-thioxane), and those containing at least one nitrogen atom and at least one sulfur atom (e.g., thiazolidine and thiamorpholine rings).

Some examples of unsaturated heterocyclic groups include those containing at least one oxygen atom (e.g., furan, pyran, 1,4-dioxin, and dibenzodioxin rings), those containing at least one nitrogen atom (e.g., pyrrole, imidazole, pyrazole, pyridine, pyrazine, pyrimidine, 1,3,5-triazine, azepine, diazepine, indole, purine, benzimidazole, indazole, 2,2'-bipyridine, quinoline, isoquinoline, phenanthroline, quinoxaline, quinazoline, pyridazine, and cinnoline), those containing at least one sulfur atom (e.g., thiophene, thianaphthene, and benzothiophene rings), those containing at least one oxygen atom and at least one nitrogen atom (e.g., oxazole, isoxazole, benzoxazole, benzisoxazole, and oxazoline rings), and those containing at least one nitrogen atom and at least one sulfur atom (e.g., thiazole, isothiazole, benzothiazole, benzoisothiazole, and thiazoline rings).

In a first aspect, the invention is directed to a lithium ion battery electrolyte that includes an ionic liquid of the formula $Y^+X^-$, wherein $Y^+$ is a cationic component of the ionic liquid and $X^-$ is an anionic component of the ionic liquid. The formula $(Y^+)(X^-)$ is meant to encompass a cationic component $(Y^+)$ having any valency of positive charge, and an anionic component $(X^-)$ having any valency of negative charge, provided that the charge contributions from the cationic portion and anionic portion are counterbalanced in order for charge neutrality to be preserved in the ionic liquid molecule. More specifically, the formula $(Y^+)(X^-)$ is meant to encompass the more generic formula $(Y^{+a})_y(X^{-b})_x$, wherein the variables a and b are, independently, non-zero integers, and the subscript variables x and y are, independently, non-zero integers, such that a.y=b.x (wherein the period placed between variables indicates multiplication of the variables). The foregoing generic formula encompasses numerous possible sub-formulas, such as, for example, $(Y^+)(X^-)$, $(Y^{+2})(X^-)_2$, $(Y^+)_2(X^{-2})$, $(Y^{+2})_2(X^{-2})_2$, $(Y^{+3})(X^-)_3$, $(Y^+)_3(X^{-3})$, $(Y^{+3})_2(X^{-2})_3$, and $(Y^{+2})_3(X^{-3})_2$. For simplicity, numerous embodiments of ionic liquids, described below, designate the anion as $X^-$, which in its strict sense indicates a monovalent anion. However, the anion designated as $X^-$ is meant to encompass an anion of any valency, such as any of the valencies described above and further below, unless otherwise specified. In some embodiments, $Y^+$ can be a metal cation (e.g., an alkali metal, such as $Li^+$), while in other embodiments $Y^+$ is not a metal cation. In some embodiments, $Y^+$ can be an inorganic species, while in other embodiments, $Y^+$ is an organic species.

The ionic liquid is typically a liquid at room temperature (e.g., 15, 18, 20, 22, 25, or 30° C.) or lower. However, in some embodiments, the ionic liquid may become a liquid at a higher temperature than 30° C. if it is used at an elevated temperature that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C.

The density of the ionic liquid is generally above 1.2 g/mL at an operating temperature of interest, and particularly at a temperature within 20-30° C. In different embodiments, the density of the ionic liquid can be at least 1.2, 1.3, 1.4, 1.5, 1.6, 1.7, or 1.8 g/mL, or a particular range bounded by any two of these values.

The viscosity of the ionic liquid is typically no more than 50,000 centipoise (50,000 cP) at an operating temperature of interest, and particularly at a temperature within 20-30° C. More typically, the viscosity of the ionic liquid is no more than about 25,000 cP, 10,000 cP, 5,000 cP, 2,000 cP, 1,000 cP, 800 cP, 700 cP, 600 cP, 500 cP, 400 cP, 300 cP, 200 cP, 100 cP, or 50 cP.

In one set of embodiments, the cationic portion ($Y^+$) of the ionic liquid $Y^+X^-$ is an ammonium species. In some embodiments, the ammonium cation portion includes a heterocyclic ring having a positively-charged ring nitrogen atom. The heterocyclic ring having a positively-charged ring nitrogen atom can be monocyclic, bicyclic, tricyclic, or a higher cyclic (polycyclic) ring system. Some examples of a heterocyclic ring having a positively-charged ring nitrogen atom include imidazolium, pyridinium, pyrazinium, pyrrolidinium, piperidinium, piperazinium, morpholinium, pyrrolium, pyrazolium, pyrimidinium, triazolium, oxazolium, thiazolium, triazinium, and cyclic guanidinium rings. Any of the foregoing cationic rings may be bound or fused with one or more other saturated or unsaturated (e.g., aromatic) rings, such as a benzene, cyclohexane, cyclohexene, pyridine, pyrazine, pyrrolidine, piperidine, piperazine, pyrrole, pyrazole, pyrimidine, or indole rings. Some examples of fused charged rings include benzimidazolium, pyrrolo[1,2-a]pyrimidinium, indolium, quinolinium, quinazolinium, quinoxalinium, 5,6,7,8-tetrahydroimidazo[1,2-a]pyridine, and H-imidazo[1,2-a]pyridine. Any of the foregoing cationic rings may be substituted by one or more hydrocarbon groups (R) as further described below. Typically, at least one ring nitrogen atom is substituted with a hydrocarbon group (R) to provide the positive charge. Ionic liquids containing any of the foregoing cationic components are either commercially available or can be synthesized by procedures well-known in the art, as evidenced by, for example, T. L. Greaves, et al., "Protic Ionic Liquids Properties and Applications", Chem. Rev., 108, pp. 206-237 (2008), the contents of which are herein incorporated by reference in their entirety. Any of the ionic liquids described in the foregoing reference may be used herein.

In one embodiment, $Y^+$ is an imidazolium group, which results in an imidazolium-based ionic liquid having a structure of the general formula:

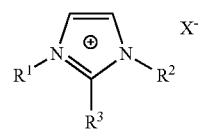

(1)

In Formula (1) above, $R^1$, $R^2$ and $R^3$ are each independently H or a saturated or unsaturated, straight-chained, branched, or cyclic hydrocarbon group (R), as further described below, having at least one carbon atom, and $X^-$ is a counteranion, as further described infra. $R^3$ may also be a CN group. In some embodiments, $R^1$ and $R^2$, or $R^1$ and $R^3$, or $R^1$ and $R^3$ are different in structure or number of carbon atoms, whereas in other embodiments, $R^1$ and $R^2$, or $R^1$ and $R^3$, or $R^1$ and $R^3$ are the same either in structure or number of carbon atoms. In different embodiments, $R^1$, $R^2$ and $R^3$ each independently have a minimum of at least one, two, three, four, five, six, seven, or eight carbon atoms. In other embodiments, $R^1$, $R^2$ and $R^3$ each independently have a maximum of two, three, four, five, six, seven, eight, nine, ten, eleven, twelve, thirteen, fourteen, fifteen, sixteen, seventeen, or eighteen carbon atoms. In other embodiments, $R^1$, $R^2$ and $R^3$ independently have a number of carbon atoms within a range of carbon atoms bounded by any of the exemplary minimum and maximum carbon numbers provided above. As the double bonds shown in Formula (1) are generally delocalized, other structurally equivalent depictions may be possible for the imidazolium ring.

In a first embodiment, one, two, or all of $R^1$, $R^2$ and $R^3$ in Formula (1) are saturated and straight-chained hydrocarbon groups (i.e., straight-chained alkyl groups). Some examples of straight-chained alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, and n-octadecyl groups.

In a second embodiment, one, two, or all of $R^1$, $R^2$ and $R^3$ in Formula (1) are saturated and branched hydrocarbon groups (i.e., branched alkyl groups). Some examples of branched alkyl groups include isopropyl, isobutyl, sec-butyl, t-butyl, isopentyl, neopentyl, 2-methylpentyl, 3-methylpentyl, and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ saturated and branched hydrocarbon groups.

In a third embodiment, one, two, or all of $R^1$, $R^2$ and $R^3$ in Formula (1) are saturated and cyclic hydrocarbon groups (i.e., cycloalkyl groups). Some examples of cycloalkyl groups include cyclopropyl, cyclobutyl, cyclopentyl, cyclohexyl, cycloheptyl, cyclooctyl, and their methyl-, ethyl-, and propyl-substituted derivatives and/or their methylene, dimethylene, trimethylene, and tetramethylene cross-linked derivatives (as crosslinked to a nitrogen atom of the imidazolium ring). The cycloalkyl group can also be a polycyclic (e.g., bicyclic or tricyclic) group by either possessing a bond between two of the ring groups (e.g., dicyclohexyl) or a shared (i.e., fused) side (e.g., decalin and norbornane).

In a fourth embodiment, one, two, or all of $R^1$, $R^2$ and $R^3$ in Formula (1) are unsaturated and straight-chained hydrocarbon groups (i.e., straight-chained olefinic or alkenyl groups).

Some examples of straight-chained olefinic groups include vinyl, 2-propen-1-yl, 3-buten-1-yl, 2-buten-1-yl, butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl, and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and straight-chained hydrocarbon groups.

In a fifth embodiment, one, two, or all of $R^1$, $R^2$ and $R^3$ in Formula (1) are unsaturated and branched hydrocarbon groups (i.e., branched olefinic or alkenyl groups). Some branched olefinic groups include 2-propen-2-yl, 3-buten-2-yl, 3-buten-3-yl, 4-penten-2-yl, 4-penten-3-yl, 3-penten-2-yl, 3-penten-3-yl, 2,4-pentadien-3-yl, and the numerous $C_6$, $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and branched hydrocarbon groups.

In a sixth embodiment, one, two, or all of $R^1$, $R^2$ and $R^3$ in Formula (1) are unsaturated and cyclic hydrocarbon groups. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, cyclooctatetraenyl, and their methyl-, ethyl-, and propyl-substituted derivatives and/or their methylene, dimethylene, trimethylene, and tetramethylene cross-linked derivatives (as crosslinked to a nitrogen atom of the imidazolium ring). The unsaturated cyclic hydrocarbon group can also be a polycyclic (e.g., bicyclic or tricyclic) group by either possessing a bond between two of the ring groups (e.g., biphenyl) or a shared (i.e., fused) side (e.g., naphthalene, anthracene, and phenanthrene).

In one embodiment, as in the examples above, one or more of the hydrocarbon groups (R) are composed solely of carbon and hydrogen, i.e., do not include one or more heteroatoms, such as oxygen or nitrogen atoms. In another embodiment, one or more of the hydrocarbon groups include one or more heteroatoms, such as one or more oxygen, nitrogen, and/or fluorine atoms. Some examples of oxygen-containing hydrocarbon groups include those possessing one or more hydroxyl (OH) groups, alkoxide (—OR), carbonyl groups (e.g., ketone, ester, amide, or urea functionalities), and/or carbon-oxygen-carbon (ether) groups. In particular embodiments, the oxygen-containing hydrocarbon group includes two or more ether groups, such as the group —$CH_2$—$OCH_2CH_3$, —$CH_2CH_2$—$OCH_2CH_3$, —$CH_2$—$OCH(CH_3)_2$, or —$CH_2$—$OCH_2CH_2CH_3$, or a dialkyleneoxide, trialkyleneoxide, or polyalkyleneoxide group, such as a polyethyleneoxide group. Some examples of nitrogen-containing hydrocarbon groups include those possessing one or more primary amine groups, secondary amine groups, tertiary amine groups, and/or quaternary amine groups, wherein it is understood that a quaternary amine group necessarily possesses a positive charge and requires a counteranion. The amino groups can be, for example, —$NH_2$, —NHR, and —$NR_2$, or imino groups, such as =N—, =N—H or =N—R groups. Some examples of fluorine-containing hydrocarbon groups (i.e., fluorocarbon groups) include the partially-substituted varieties (e.g., fluoromethyl, difluoromethyl, 2-fluoroethyl, 2,2-difluoroethyl, 2,2,2-trifluoroethyl, and the like) and perfluoro-substituted varieties (e.g., perfluoromethyl, perfluoroethyl, perfluoropropyl, perfluorobutyl, and the like). The hydrocarbon group may optionally include a silicon-containing group, such as a silyl group, such as a trimethylsilyl (TMS) group, particularly a —$CH_2$-TMS group, that may be bound to, for example, a ring nitrogen atom. In some embodiments, any one or more of the foregoing exemplary heteroatoms or heteroatom-containing substituents may be excluded from Formula (1) or from any of the cationic and/or anionic portions of the ionic liquids described herein.

The ionic liquids according to Formula (1) can contain any of the above-described imidazolium-based cationic components associated (i.e., complexed) with counteranions $X^-$ further described infra. Some general examples of imidazolium-based ionic liquids according to Formula (1) include 1,3-dimethylimidazolium$^+X^-$, 1,2,3-trimethylimidazolium$^+X^-$, 2-ethyl-1,3-dimethylimidazolium$^+X^-$, 2-n-propyl-1,3-dimethylimidazolium$^+X^-$, 2-n-butyl-1,3-dimethylimidazolium$^+X^-$, 1-ethyl-2,3-dimethylimidazolium$^+X^-$, 1-n-propyl-2,3-dimethylimidazolium$^+X^-$, 1-n-butyl-2,3-dimethylimidazolium$^+X^-$, 1-methyl-3-ethylimidazolium$^+X^-$, 1-methyl-3-n-propylimidazolium$^+X^-$, 1-methyl-3-isopropylimidazolium$^+X^-$, 1-methyl-3-n-butylimidazolium$^+X^-$ (i.e., BMIM$^+X^-$), 1-methyl-3-isobutylimidazolium$^+X^-$, 1-methyl-3-sec-butylimidazolium$^+X^-$, 1-methyl-3-t-butylimidazolium$^+X^-$, 1,3-diethylimidazolium$^+X^-$, 1-ethyl-3-n-propylimidazolium$^+X^-$, 1-ethyl-3-isopropylimidazolium$^+X^-$, 1-ethyl-3-n-butylimidazolium$^+X^-$, 1-ethyl-3-isobutylimidazolium$^+X^-$, 1-ethyl-3-sec-butylimidazolium$^+X^-$, 1-ethyl-3-t-butylimidazolium$^+X^-$, 1,3-di-n-propylimidazolium$^+X^-$, 1-n-propyl-3-isopropylimidazolium$^+X^-$, 1-n-propyl-3-n-butylimidazolium$^+X^-$, 1-n-propyl-3-isobutylimidazolium$^+X^-$, 1-n-propyl-3-sec-butylimidazolium$^+X^-$, 1-n-propyl-3-t-butylimidazolium$^+X^-$, 1,3-diisopropylimidazolium$^+X^-$, 1-isopropyl-3-n-butylimidazolium$^+X^-$, 1-isopropyl-3-isobutylimidazolium$^+X^-$, 1-isopropyl-3-sec-butylimidazolium$^+X^-$, 1-isopropyl-3-t-butylimidazolium$^+X^-$, 1,3-di-n-butylimidazolium$^+X^-$, 1-n-butyl-3-isobutylimidazolium$^+X^-$, 1-n-butyl-3-sec-butylimidazolium$^+X^-$, 1-n-butyl-3-t-butylimidazolium$^+X^-$, 1,3-diisobutylimidazolium$^+X^-$, 1-isobutyl-3-sec-butylimidazolium$^+X^-$, 1-isobutyl-3-t-butylimidazolium$^+X^-$, 1,3-di-sec-butylimidazolium$^+X^-$, 1-sec-butyl-3-t-butylimidazolium$^+X^-$, 1,3-di-t-butylimidazolium$^+X^-$, 1-methyl-3-pentylimidazolium$^+X^-$, 1-methyl-3-hexylimidazolium$^+X^-$, 1-methyl-3-heptylimidazolium$^+X^-$, 1-methyl-3-octylimidazolium$^+X^-$, 1-methyl-3-decylimidazolium$^+X^-$, 1-methyl-3-dodecylimidazolium$^+X^-$, 1-methyl-3-tetradecylimidazolium$^+X^-$, 1-methyl-3-hexadecylimidazolium$^+X^-$, 1-methyl-3-octadecylimidazolium$^+X^-$, 1-(2-hydroxyethyl)-3-methylimidazolium$^+X^-$, and 1-allyl-3-methylimidazolium$^+X^-$.

In Formula (1), one or both of the hydrogen atoms at the 4- and 5-positions may also be substituted with a group, such as a hydrocarbon group, such as any of the hydrocarbon groups described above, an alkoxide group (—OR), hydroxy group (OH), CN group, amino group (—$NH_2$, —NHR, or —$NR_2$), carboxamide group (—C(O)$NR_2$ wherein one or both R groups can be replaced with H), and/or halogen atom (e.g., F, Cl, Br, or I atom), wherein the R groups may be the same or different and may or may not be interconnected to form a ring. For example, one or both of the 4- and 5-positions of the imidazole ring may be substituted with a methyl, ethyl, n-propyl, isopropyl, n-butyl, isobutyl, sec-butyl, or t-butyl group. $R^3$ at the 2-position may also be selected from any of the foregoing groups provided for the 4- and 5-positions. Moreover, any one or more of $R^1$, $R^2$ and $R^3$ may or may not also include an imidazole or imidazolium ring, which therefore may result in a bi-imidazolium, tri-imidazolium, or tetra-imidazolium cationic portion.

In a particular embodiment of Formula (1), $R^1$ and $R^3$ are methyl groups, and $R^2$ is a hydrocarbon group. When $R^2$ is n-butyl, the resulting cation in Formula (1) is herein designated as DMBIm.

In other embodiments of Formula (1), $R^1$ and $R^3$ (or $R^2$ and $R^3$) are interconnected to form a bicyclic cationic structure containing an imidazolium ring. The interconnection can be, for example, a saturated or unsaturated hydrocarbon linker. The saturated or unsaturated hydrocarbon linker typically contains three, four, or five carbon atoms. In particular embodiments, the ionic liquid has the following formula:

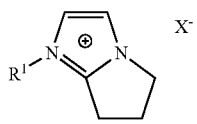
(1-1)

In Formula (1-1), $R^1$ is typically a hydrocarbon group, particularly a hydrocarbon group having one, two, three, four, five, or six carbon atoms. In the particular embodiment of Formula (1-1) when $R^1$ is ethyl, the cationic portion of the ionic liquid is herein designated as ETMIm.

In another embodiment, the ammonium ionic liquid is an N-hydrocarbylpyridinium-based ionic liquid having a structure of the general formula:

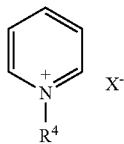
(2)

In Formula (2), $R^4$ represents a hydrocarbon group, with or without heteroatom substitution, such as any of the hydrocarbon groups (R) described above for $R^1$, $R^2$ and $R^3$ of Formula (1), and the counteranion $X^-$ can be any counteranion, such as those further described infra. Some general examples of N-alkylpyridinium-based ionic liquids include N-methylpyridinium $X^-$, N-ethylpyridinium $X^-$, N-n-propylpyridinium $X^-$, N-isopropylpyridinium $X^-$, N-n-butylpyridinium $X^-$, N-isobutylpyridinium $X^-$, N-sec-butylpyridinium $X^-$, N-t-butylpyridinium $X^-$, N-n-pentylpyridinium $X^-$, N-isopentylpyridinium $X^-$, N-neopentylpyridinium $X^-$, N-n-hexylpyridinium $X^-$, N-n-heptylpyridinium $X^-$, N-n-octylpyridinium $X^-$, N-n-nonylpyridinium $X^-$, N-n-decylpyridinium $X^-$, N-n-undecylpyridinium $X^-$, N-n-dodecylpyridinium $X^-$, N-n-tridecylpyridinium $X^-$, N-n-tetradecylpyridinium $X^-$, N-n-pentadecylpyridinium $X^-$, N-n-hexadecylpyridinium $X^-$, N-n-heptadecylpyridinium $X^-$, N-n-octadecylpyridinium $X^-$, N-vinylpyridinium $X^-$, N-allylpyridinium $X^-$, N-phenylpyridinium $X^-$, N-(2-hydroxyethyl)pyridinium $X^-$, N-benzylpyridinium $X^-$, and N-phenethylpyridinium X.

In Formula (2), any one or more of the hydrogen atoms on the ring carbon atoms can be substituted with one or more other groups, such as a hydrocarbon group (R), alkoxide group (—OR), hydroxy group (OH), amino group (—$NH_2$, —NHR, or —$NR_2$), carboxamide group (—C(O)$NR_2$ wherein one or both R groups can be replaced with H), and/or halogen atom (e.g., F, Cl, Br, or I atom), wherein the R groups may be the same or different and may or may not be interconnected to form a ring. Some examples of such ionic liquids include N-methyl-4-methylpyridinium $X^-$, N-ethyl-4-methylpyridinium $X^-$, N-methyl-4-ethylpyridinium $X^-$, N-methyl-4-isopropylpyridinium $X^-$, N-isopropyl-4-methylpyridinium $X^-$, and N-octyl-4-methylpyridinium X. Moreover, any one or two of the ring carbon atoms ortho, meta, or para to the shown ring nitrogen atom in the pyridinium ring may be replaced with a respective number of ring nitrogen atoms, which may be neutral or positively charged ring nitrogen atoms.

In another embodiment, the ammonium ionic liquid is a quaternary ammonium ionic liquid having a structure of the general formula:

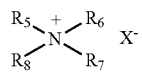
(3)

In Formula (3), $R^5$, $R^6$, $R^7$, and $R^8$ independently represent a hydrocarbon group, with or without heteroatom substitution, such as any of the hydrocarbon groups (R) described above for $R^1$, $R^2$ and $R^3$ of Formula (1), or a hydrogen atom, wherein at least one of $R^5$, $R^6$, $R^7$, and $R^8$ represents a hydrocarbon group (with or without heteroatom substitution), and the counteranion $X^-$ can be any counteranion, such as those described infra. In one embodiment, one of $R^5$, $R^6$, $R^7$, and $R^8$ is a hydrocarbon group while the rest are hydrogen atoms. In another embodiment, two of $R^5$, $R^6$, $R^7$, and $R^8$ are hydrocarbon groups while the other two are hydrogen atoms. In another embodiment, three of $R^5$, $R^6$, $R^7$, and $R^8$ are hydrocarbon groups while the remaining one is a hydrogen atom. In another embodiment, all of $R^5$, $R^6$, $R^7$, and $R^8$ are hydrocarbon groups (or more specifically, alkyl groups), thereby resulting in a tetrahydrocarbylammonium group (or more specifically, a tetraalkylammonium group). Some general examples of quaternary ammonium ionic liquids include methylammonium$^+X^-$, dimethylammonium$^+X^-$, trimethylammonium$^+X^-$, tetramethylammonium$^+X^-$, ethylammonium$^+X^-$, ethyltrimethylammonium$^+X^-$, diethylammonium$^+X^-$, triethylammonium$^+X^-$, tetraethylammonium$^+X^-$, n-propylammonium$^+X^-$, n-propyltrimethylammonium$^+X^-$, isopropylammonium$^+X^-$, n-butylammonium$^+X^-$, n-butyltrimethylammonium$^+X^-$, n-butylmethylammonium$^+X^-$, di-(n-butyl)dimethylammonium$^+X^-$, tri-(n-butyl)methylammonium$^+X^-$, n-pentylammonium$^+X^-$, n-pentyltrimethylammonium$^+X^-$, tri-(n-pentyl)methylammonium$^+X^-$, n-hexylammonium$^+X^-$, n-hexyltrimethylammonium$^+X^-$, tri-(n-hexyl)methylammonium$^+X^-$, n-heptylammonium$^+X^-$, n-heptyltrimethylammonium$^+X^-$, tri-(n-heptyl)methylammonium$^+X^-$, n-octylammonium$^+X^-$, n-octyltrimethylammonium$^+X^-$, tri-(n-octyl)methylammonium$^+X^-$, benzyltrimethylammonium$^+X^-$, choline$^+X^-$, 2-hydroxyethylammonium$^+X^-$, allylammonium$^+X^-$, allyltrimethylammonium$^+X^-$, [(2-methacryloxy)ethyl]trimethylammonium$^+X^-$, and (4-vinylbenzyl)trimethylammonium$^+X^-$.

In another embodiment, the ammonium ionic liquid is a cyclic guanidinium-based ionic liquid. The cyclic guanidinium-based ionic liquid can have any of the structures known in the art, including those described in U.S. Pat. No. 8,129,543 and M. G. Bogdanov, et al., *Z. Naturforsch*, 65b, pp. 37-48, 2010, the contents of which are herein incorporated by reference in their entirety.

The cyclic guanidinium-based ionic liquid can be described by the following general formula:

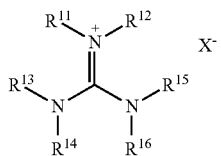

(4)

In Formula (4) above, $R^{11}$, $R^{12}$, $R^{13}$, $R^{14}$, $R^{15}$, and/or $R^{16}$ groups independently represent a hydrocarbon group, with or without heteroatom substitution, such as any of the hydrocarbon groups (R) described above for $R^1$, $R^2$ and $R^3$ of Formula (1), or a hydrogen atom, provided that at least two of $R^{11}$, $R^{12}$, $R^{13}$, $R^{14}$, $R^{15}$, and $R^{16}$ are interconnected to form a ring or a bicyclic, tricylic, or higher cyclic ring system. In some embodiments, $R^{11}$, $R^{12}$, $R^{13}$, $R^{14}$, $R^{15}$, and/or $R^{16}$ groups are independently selected from methyl, ethyl, n-propyl, isopropyl, n-butyl, isobutyl, sec-butyl, t-butyl, n-pentyl, isopentyl, neopentyl, n-hexyl, isohexyl, vinyl, and allyl groups, provided that at least two of $R^{11}$, $R^{12}$, $R^{13}$, $R^{14}$, $R^{15}$, and $R^{16}$ are interconnected to form a ring or a bicyclic, tricyclic, or higher cyclic ring system. In a first set of embodiments, $R^{11}$ and $R^{12}$ are interconnected. In a second set of embodiments, $R^{13}$ and $R^{14}$, or $R^{15}$ and $R^{16}$, are interconnected. In a third set of embodiments, $R^{11}$ and $R^{13}$, or $R^{12}$ and $R^{15}$, are interconnected. In a fourth set of embodiments, $R^{14}$ and $R^{16}$ are interconnected. In other embodiments, any two or three of the foregoing types of interconnections are combined. The foregoing embodiments also include the possibility that all of $R^{11}$, $R^{12}$, $R^{13}$, $R^{14}$, $R^{15}$, and $R^{16}$ groups are engaged in an interconnection. The counteranion $X^-$ can be any counteranion, such as those described infra.

In another embodiment, the ammonium ionic liquid is a piperidinium-based ionic liquid having a structure of the following general formula:

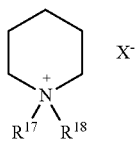

(5)

In Formula (5), $R^{17}$ and $R^{18}$ independently represent a hydrocarbon group, with or without heteroatom substitution, such as any of the hydrocarbon groups (R) described above for $R^1$, $R^2$ and $R^3$ of Formula (1), and the counteranion $X^-$ can be any of the counteranions described infra. Some examples of piperidinium-based ionic liquids include 1,1-dimethylpiperidinium$^+$X$^-$, 1-methyl-1-ethylpiperidinium$^+$X$^-$, 1-methyl-1-propylpiperidinium$^+$X$^-$, 1-methyl-1-butylpiperidinium$^+$X$^-$, 1-methyl-1-isobutylpiperidinium$^+$X$^-$, 1-methyl-1-pentylpiperidinium$^+$X$^-$, 1-methyl-1-hexylpiperidinium$^+$X$^-$, 1-methyl-1-heptylpiperidinium$^+$X$^-$, 1-methyl-1-octylpiperidinium$^+$X$^-$, 1-methyl-1-decylpiperidinium$^+$X$^-$, 1-methyl-1-dodecylpiperidinium$^+$X$^-$, 1-methyl-1-tetradecylpiperidinium$^+$X$^-$, 1-methyl-1-hexadecylpiperidinium$^+$X$^-$, 1-methyl-1-octadecylpiperidinium$^+$X$^-$, 1,1-diethylpiperidinium$^+$X$^-$, 1,1-dipropylpiperidinium$^+$X$^-$, 1,1-dibutylpiperidinium$^+$X$^-$, and 1,1-diisobutylpiperidinium$^+$X$^-$. In some embodiments, the piperidinium ring shown in Formula (5) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In another embodiment, the ammonium ionic liquid is a pyrrolidinium-based ionic liquid having a structure of the following general formula:

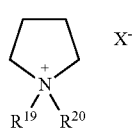

(6)

In Formula (6), $R^{19}$ and $R^{20}$ independently represent a hydrocarbon group, with or without heteroatom substitution, such as any of the hydrocarbon groups (R) described above for $R^1$, $R^2$ and $R^3$ of Formula (1), and the counteranion $X^-$ can be any of the counteranions described infra. Some examples of pyrrolidinium-based ionic liquids include 1,1-dimethylpyrrolidinium$^+$X$^-$, 1-methyl-1-ethylpyrrolidinium$^+$X$^-$, 1-methyl-1-propylpyrrolidinium$^+$X$^-$, 1-methyl-1-butylpyrrolidinium$^+$X$^-$, 1-methyl-1-isobutylpyrrolidinium$^+$X$^-$, 1-methyl-1-pentylpyrrolidinium$^+$X$^-$, 1-methyl-1-hexylpyrrolidinium$^+$X$^-$, 1-methyl-1-heptylpyrrolidinium$^+$X$^-$, 1-methyl-1-octylpyrrolidinium$^+$X$^-$, 1-methyl-1-decylpyrrolidinium$^+$X$^-$, 1-methyl-1-dodecylpyrrolidinium$^+$X$^-$, 1-methyl-1-tetradecylpyrrolidinium$^+$X$^-$, 1-methyl-1-hexadecylpyrrolidinium$^+$X$^-$, 1-methyl-1-octadecylpyrrolidinium$^+$X$^-$, 1,1-diethylpyrrolidinium$^+$X$^-$, 1,1-dipropylpyrrolidinium$^+$X$^-$, 1,1-dibutylpyrrolidinium$^+$X$^-$, and 1,1-diisobutylpyrrolidinium$^+$X$^-$. In some embodiments, the pyrrolidinium ring shown in Formula (6) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In other aspects, the ionic liquid is a phosphonium-based ionic liquid. The phosphonium-based ionic liquid can have a structure of the following general formula:

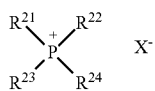

(7)

In Formula (7), $R^{21}$, $R^{22}$, $R^{23}$, and $R^{24}$ independently represent a hydrocarbon group, with or without heteroatom substitution, such as any of the hydrocarbon groups (R) described above for $R^1$, $R^2$ and $R^3$ of Formula (1), and the counteranion X⁻ can be any of the counteranions described infra. Some general examples of phosphonium-based ionic liquids include tetramethylphosphonium⁺X⁻, tetraethylphosphonium⁺X⁻, tetrapropylphosphonium⁺X⁻, tetrabutylphosphonium⁺X⁻, tetrapentylphosphonium⁺X⁻, tetrahexylphosphonium⁺X⁻, tetraheptylphosphonium⁺X⁻, tetraoctylphosphonium⁺X⁻, tetranonylphosphonium⁺X⁻, tetradecylphosphonium⁺X⁻, tetraphenylphosphonium⁺X⁻, tetrabenzylphosphonium⁺X⁻, ethyltrimethylphosphonium⁺X⁻, n-propyltrimethylphosphonium⁺X⁻, butyltrimethylphosphonium⁺X⁻, dibutyldimethylphosphonium⁺X⁻, tributylmethylphosphonium⁺X⁻, butyltriethylphosphonium⁺X⁻, dibutyldiethylphosphonium⁺X⁻, tributylethylphosphonium⁺X⁻, triisobutylmethylphosphonium⁺X⁻, tributylhexylphosphonium⁺X⁻, tributylheptylphosphonium⁺X⁻, tributyloctylphosphonium⁺X⁻, tributyldecylphosphonium⁺X⁻, tributyldodecylphosphonium⁺X⁻, tributyltetradecylphosphonium⁺X⁻, tributylhexadecylphosphonium⁺X⁻, hexyltrimethylphosphonium⁺X⁻, dihexyldimethylphosphonium⁺X⁻, trihexylmethylphosphonium⁺X⁻, hexyltriethylphosphonium⁺X⁻, trihexyloctylphosphonium⁺X⁻, trihexyldecylphosphonium⁺X⁻, trihexyldodecylphosphonium⁺X⁻, trihexyltetradecylphosphonium⁺X⁻, trihexylhexadecylphosphonium⁺X⁻, octyltrimethylphosphonium⁺X⁻, dioctyldimethylphosphonium⁺X⁻, trioctylmethylphosphonium⁺X⁻, octyltriethylphosphonium⁺X⁻, trioctyldecylphosphonium⁺X⁻, trioctyldodecylphosphonium⁺X⁻, trioctyltetradecylphosphonium⁺X⁻, trioctylhexadecylphosphonium⁺X⁻, tridecylmethylphosphonium⁺X⁻, phenyltrimethylphosphonium⁺X⁻, phenyltriethylphosphonium⁺X⁻, phenyltripropylphosphonium⁺X⁻, phenyltributylphosphonium⁺X⁻, diphenyldimethylphosphonium⁺X⁻, triphenylmethylphosphonium⁺X⁻, and benzyltrimethylphosphonium⁺X⁻.

In some embodiments of Formula (7), two or three of $R^{21}$, $R^{22}$, $R^{23}$, and $R^{24}$ are interconnected to form a phosphonium-containing ring or bicyclic ring system. Some general examples of phosphonium ionic liquids containing a phosphorus-containing ring are provided by the following formulas:

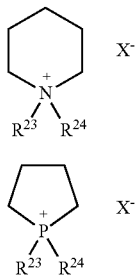

(7a)

(7b)

In other aspects, the ionic liquid is a sulfonium-based ionic liquid. The sulfonium-based ionic liquid can have a structure of the following general formula:

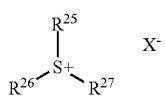

(8)

In Formula (8), $R^{25}$, $R^{26}$, and $R^{27}$ independently represent a hydrocarbon group, with or without heteroatom substitution, such as any of the hydrocarbon groups (R) described above for $R^1$, $R^2$ and $R^3$ of Formula (1), and the counteranion X⁻ can be any of the counteranions described infra. Some general examples of sulfonium-based ionic liquids include trimethylsulfonium⁺X⁻, dimethylethylsulfonium⁺X⁻, diethylmethylsulfonium⁺X⁻, triethylsulfonium⁺X⁻, dimethylpropylsulfonium⁺X⁻, dipropylmethylsulfonium⁺X⁻, tripropylsulfonium⁺X⁻, dimethylbutylsulfonium⁺X⁻, dibutylmethylsulfonium⁺X⁻, tributylsulfonium⁺X⁻, dimethylhexylsulfonium⁺X⁻, dihexylmethylsulfonium⁺X⁻, trihexylsulfonium⁺X⁻, dimethyloctylsulfonium⁺X⁻, dioctylmethylsulfonium⁺X⁻, and trioctylsulfonium⁺X⁻.

In some embodiments of Formula (8), two or three of $R^{25}$, $R^{26}$, and $R^{27}$ are interconnected to form a sulfonium-containing ring or bicyclic ring system, as described above for the phosphonium cyclic systems. Some examples of sulfonium ionic liquids containing a sulfonium-containing ring are provided by the following formulas:

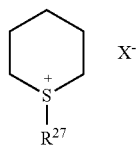

(8a)

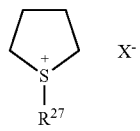

(8b)

In some embodiments, any of the above general classes or specific types of ionic liquids, or general classes or specific types of cationic portions of the above ionic liquids, are excluded. Moreover, in some embodiments, a mixture of two or more of the foregoing ionic liquids is used.

In some embodiments, the ionic liquids contain partially fluorinated or perfluorinated derivatives of any of the cationic portions described above. In the fluorinated derivative, one or more hydrogen atoms bound to any of the cation rings described above are replaced with fluorine (F) or a fluorinated substituent, such as a partially or completely fluorinated alkyl group, such as $CF_3$, or $CF_2CF_3$, or a fluorinated sulfone, such as —$SO_2F$ or —$SO_2CF_3$. The partially or perfluorinated alkyl chains typically have 1 to 6 carbon atoms, and may or may not be substituted with one or more heteroatoms other than F, such as N, O, or S. Use of such fluorinated ionic liquids may favorably reduce the viscosity and improve the ionic conductivity of the ionic liquids so that they are more rate capable.

The counteranion (X⁻) of the ionic liquid is any counteranion which, when associated with the cationic component, permits the resulting ionic compound to behave as an ionic liquid. As known in the art, the composition and structure of the counteranion strongly affects the properties (e.g., melting point, volatility, stability, viscosity, hydrophobicity, and so on) of the ionic liquid. In some embodiments, the counteranion is structurally symmetrical, while in other embodiments, the counteranion is structurally asymmetrical.

In one embodiment, the counteranion (X⁻) of the ionic liquid is non-carbon-containing (i.e., inorganic). The inorganic counteranion may, in one embodiment, lack fluorine atoms. Some examples of such counteranions include chloride, bromide, iodide, hexachlorophosphate ($PCl_6^-$), perchlorate, chlorate, chlorite, cyanate, isocyanate, thiocyanate, isothiocyanate, perbromate, bromate, bromite, periodiate, iodate, dicyanamide (i.e., N(CN)$_2^-$), tricyanamide (i.e., N(CN)$_3^-$), aluminum chlorides (e.g., Al$_2$Cl$_7^-$ and AlCl$_4^-$), aluminum bromides (e.g., AlBr$_4^-$), nitrate, nitrite, sulfate, sulfite, hydrogensulfate, hydrogensulfite, phosphate, hydrogenphosphate (HPO$_4^{2-}$), dihydrogenphosphate (H$_2$PO$_4^-$), phosphite, arsenate, antimonate, selenate, tellurate, tungstate, molybdate, chromate, silicate, the borates (e.g., borate, diborate, triborate, tetraborate), anionic borane and carborane clusters (e.g., B$_{10}$H$_{10}^{2-}$ and B$_{12}$H$_{12}^{2-}$), perrhenate, permanganate, ruthenate, perruthenate, and the polyoxometallates. The inorganic counteranion may, in another embodiment, include fluorine atoms. Some examples of such counteranions include fluoride, bifluoride (HF$_2^-$), hexafluorophosphate (PF$_6^-$), fluorophosphate (PO$_3$F$^{2-}$), tetrafluoroborate (BF$_4^-$), aluminum fluorides (e.g., AlF$_4^-$), hexafluoroarsenate (AsF$_6^-$), and hexafluoroantimonate (SbF$_6^-$).

In another embodiment, the counteranion (X$^-$) of the ionic liquid is carbon-containing (i.e., organic). The organic counteranion may, in one embodiment, lack fluorine atoms. Some examples of such counteranions include carbonate, bicarbonate, the carboxylates (e.g., formate, acetate, propionate, butyrate, valerate, lactate, pyruvate, oxalate, malonate, glutarate, adipate, decanoate, salicylate, ibuprofenate, and the like), the sulfonates (e.g., CH$_3$SO$_3^-$, CH$_3$CH$_2$SO$_3^-$, CH$_3$(CH$_2$)$_2$SO$_3^-$, benzenesulfonate, toluenesulfonate, dodecylbenzenesulfonate, docusate, and the like), the alkoxides (e.g., methoxide, ethoxide, isopropoxide, phenoxide, and glycolate), the amides (e.g., dimethylamide and diisopropylamide), diketonates (e.g., acetylacetonate), the organoborates (e.g., BR$_1$R$_2$R$_3$R$_4^-$, wherein R$_1$, R$_2$, R$_3$, R$_4$ are typically hydrocarbon groups containing 1 to 6 carbon atoms), the alkylsulfates (e.g., diethylsulfate), alkylphosphates (e.g., ethylphosphate or diethylphosphate), and the phosphinates (e.g., bis-(2,4,4-trimethylpentyl)phosphinate). The organic counteranion may, in another embodiment, include fluorine atoms. Some examples of such counteranions include the fluorosulfonates (e.g., CF$_3$SO$_3^-$, CF$_3$CF$_2$SO$_3^-$, CF$_3$(CF$_2$)$_2$SO$_3^-$, CHF$_2$CF$_2$SO$_3^-$, and the like), the fluoroalkoxides (e.g., CF$_3$O$^-$, CF$_3$CH$_2$O$^-$, CF$_3$CF$_2$O$^-$, and pentafluorophenolate), the fluorocarboxylates (e.g., trifluoroacetate and pentafluoropropionate), and the fluorosulfonylimides (e.g., (CF$_3$SO$_2$)$_2$N$^-$).

In particular embodiments, the counteranion (X$^-$) of the ionic liquid has a structure according to the following general formula:

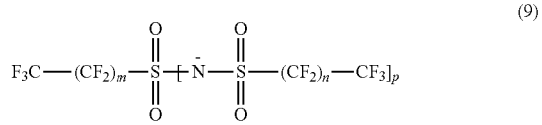

(9)

In Formula (9) above, subscripts m and n are independently 0 or an integer of 1 or above. Subscript p is 0 or 1, provided that when p is 0, the group —N—SO$_2$—(CF$_2$)$_n$CF$_3$ subtended by p is replaced with an oxide atom connected to the sulfur atom (S).

In one embodiment of Formula (9), subscript p is 1, so that Formula (9) reduces to the chemical formula:

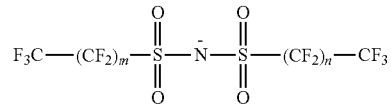

(9a)

In one embodiment of Formula (9a), m and n are the same number, thereby resulting in a symmetrical counteranion. In another embodiment of formula (9a), m and n are not the same number, thereby resulting in an asymmetrical counteranion.

In a first set of embodiments of Formula (9a), m and n are independently at least 0 and up to 1, 2, 3, 4, 5, 6, 7, 8, 9, 10, or 11. When m and n are both 0, the resulting anion has the formula F$_3$CSO$_2$NSO$_2$CF$_3$, i.e., bis-(trifluoromethylsulfonyl)imide, or Tf$_2$N$^-$, or TFSI. In another embodiment, m and n are not both 0. For example, in a particular embodiment, m is 0 while n is a value of 1 or above (e.g., 1, 2, 3, 4, 5, 6, 7, 8, 9, 10, or 11). Some examples of such anions include F$_3$CSO$_2$NSO$_2$CF$_2$CF$_3$, F$_3$CSO$_2$NSO$_2$(CF$_2$)$_2$CF$_3$, F$_3$CSO$_2$NSO$_2$(CF$_2$)$_3$CF$_3$, F$_3$CSO$_2$NSO$_2$(CF$_2$)$_4$CF$_3$, F$_3$CSO$_2$NSO$_2$(CF$_2$)$_5$CF$_3$, and so on, wherein it is understood that, in the foregoing examples, the negative sign indicative of a negative charge (i.e., "−") in the anion has been omitted for the sake of clarity.

In a second set of embodiments of Formula (9a), m and n are independently at least 1 and up to 2, 3, 4, 5, 6, 7, 8, 9, 10, or 11. For example, in a particular embodiment, m is 1 while n is a value of 1 or above (e.g., 1, 2, 3, 4, 5, 6, 7, 8, 9, 10, or 11). Some examples of such anions include N[SO$_2$CF$_2$CF$_3$]$_2$ (i.e., "BEIT$^-$"), F$_3$CF$_2$CSO$_2$NSO$_2$(CF$_2$)$_2$CF$_3$, F$_3$CF$_2$CSO$_2$NSO$_2$(CF$_2$)$_3$CF$_3$, F$_3$CF$_2$CSO$_2$NSO$_2$(CF$_2$)$_4$CF$_3$, F$_3$CF$_2$CSO$_2$NSO$_2$(CF$_2$), CF$_3$, and so on.

In a third set of embodiments of Formula (9a), m and n are independently at least 2 and up to 3, 4, 5, 6, 7, 8, 9, 10, or 11. For example, in a particular embodiment, m is 2 while n is a value of 2 or above (e.g., 2, 3, 4, 5, 6, 7, 8, 9, 10, or 11). Some examples of such anions include N[SO$_2$(CF$_2$)$_2$CF$_3$]$_2$, F$_3$C(F$_2$C)$_2$SO$_2$NSO$_2$(CF$_2$)$_3$CF$_3$, F$_3$C(F$_2$O$_2$SO$_2$NSO$_2$(CF$_2$)$_4$CF$_3$, F$_3$C(F$_2$O$_2$SO$_2$NSO$_2$(CF$_2$)$_5$CF$_3$, and so on.

In a fourth set of embodiments of Formula (9a), m and n are independently at least 3 and up to 4, 5, 6, 7, 8, 9, 10, or 11. For example, in a particular embodiment, m is 3 while n is a value of 3 or above (e.g., 3, 4, 5, 6, 7, 8, 9, 10, or 11). Some examples of such anions include N[SO$_2$(CF$_2$)$_3$CF$_3$]$_2$, F$_3$C(F$_2$C)$_3$SO$_2$NSO$_2$(CF$_2$)$_4$CF$_3$, F$_3$C(F$_2$C)$_3$SO$_2$NSO$_2$(CF$_2$)$_5$CF$_3$, F$_3$C(F$_2$C)$_3$SO$_2$NSO$_2$(CF$_2$)$_6$CF$_3$, F$_3$C(F$_2$C)$_3$SO$_2$NSO$_2$(CF$_2$)$_7$CF$_3$, and so on.

In a fifth set of embodiments of Formula (9a), m and n are independently at least 4 and up to 5, 6, 7, 8, 9, 10, or 11. For example, in a particular embodiment, m is 4 while n is a value of 4 or above (e.g., 4, 5, 6, 7, 8, 9, 10, or 11). Some examples of such anions include N[SO$_2$(CF$_2$)$_4$CF$_3$]$_2$, F$_3$C(F$_2$C)$_4$SO$_2$NSO$_2$(CF$_2$)$_5$CF$_3$, F$_3$C(F$_2$C)$_4$SO$_2$NSO$_2$(CF$_2$)$_6$CF$_3$, F$_3$C(F$_2$C)$_4$SO$_2$NSO$_2$(CF$_2$)$_7$CF$_3$, F$_3$C(F$_2$C)$_4$SO$_2$NSO$_2$(CF$_2$)$_8$CF$_3$, and so on.

In a sixth set of embodiments of Formula (9a), m and n are independently at least 5 and up to 6, 7, 8, 9, 10, or 11. For example, in a particular embodiment, m is 5 while n is a value of 5 or above (e.g., 5, 6, 7, 8, 9, 10, or 11). Some examples of such anions include N[SO$_2$(CF$_2$)$_5$CF$_3$]$_2$, F$_3$C(F$_2$C)$_5$SO$_2$NSO$_2$(CF$_2$)$_6$CF$_3$, F$_3$C(F$_2$C)$_5$SO$_2$NSO$_2$(CF$_2$)$_7$CF$_3$, F$_3$C(F$_2$C)$_5$SO$_2$NSO$_2$(CF$_2$)$_8$CF$_3$, F$_3$C(F$_2$C)$_5$SO$_2$NSO$_2$(CF$_2$)$_9$CF$_3$, and so on.

In a seventh set of embodiments of Formula (9a), m and n are independently at least 6 and up to 7, 8, 9, 10, or 11. For example, in a particular embodiment, m is 6 while n is a value of 6 or above (e.g., 6, 7, 8, 9, 10, or 11). Some examples of such anions include $N[SO_2(CF_2)_6CF_3]_2$, $F_3C(F_2C)_6SO_2NSO_2(CF_2)_7CF_3$, $F_3C(F_2C)_6SO_2NSO_2(CF_2)_8CF_3$, $F_3C(F_2O_6SO_2NSO_2(CF_2)_9CF_3$, $F_3C(F_2O_6SO_2NSO_2(CF_2)_{10}CF_3$, and so on.

In other embodiments of Formula (9a), m abides by one or a number of alternative conditions set forth in one of the foregoing seven embodiments while n abides by one or a number of alternative conditions set forth in another of the foregoing seven embodiments.

In another embodiment of Formula (9), subscript p is 0, so that Formula (9) reduces to the chemical formula:

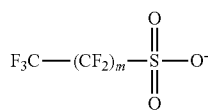

(9b)

In different exemplary embodiments of Formula (9b), m can be 0 or above (e.g., up to 1, 2, 3, 4, 5, 6, 7, 8, 9, 10, or 11), 1 or above (e.g., up to 2, 3, 4, 5, 6, 7, 8, 9, 10, or 11), 2 or above (e.g., up to 3, 4, 5, 6, 7, 8, 9, 10, or 11), 3 or above (e.g., up to 4, 5, 6, 7, 8, 9, 10, or 11), 4 or above (e.g., up to 5, 6, 7, 8, 9, 10, or 11), 5 or above (e.g., up to 6, 7, 8, 9, 10, or 11), 6 or above (e.g., up to 7, 8, 9, 10, or 11), 7 or above (e.g., up to 8, 9, 10, 11, or 12), 8 or above (e.g., up to 9, 10, 11, or 12), or 9 or above (e.g., up to 10, 11, 12, 13, 14, 15, or 16). Some examples of such anions include $F_3CSO_3^-$ (i.e., "triflate" or "TfO$^-$"), $F_3CF_2CSO_3^-$, $F_3C(F_2C)_2SO_3^-$, $F_3C(F_2C)_3SO_3^-$ (i.e., "nonaflate" or "NfO$^-$"), $F_3C(F_2C)_4SO_3^-$, $F_3C(F_2C)_5SO_3^-$, $F_3C(F_2C)_6SO_3^-$, $F_3C(F_2C)_7SO_3^-$, $F_3C(F_2C)_8SO_3^-$, $F_3C(F_2C)_9SO_3^-$, $F_3C(F_2C)_{10}SO_3^-$, $F_3C(F_2C)_{11}SO_3^-$, and so on.

In some embodiments, any one or more classes or specific types of anions described above is excluded from the ionic liquid. In other embodiments, a combination of anions is used in the ionic liquid.

The ionic liquid can be of any suitable purity level. Preferably, the ionic liquid has a purity at least or greater than 90%, 95%, 96%, 97%, 98%, 99%, 99.5%, or 99.9%. The ionic liquid is preferably substantially devoid of salt byproducts (e.g., $LiNO_3$) that are typically produced during synthesis of the ionic liquid. In preferred embodiments, it is desirable that the ionic liquid contains less than 1% by weight of salt byproducts, and more preferably, less than 0.5%, 0.1%, 0.01%, or even 0.001% by weight of salt byproducts.

In a particular aspect, the invention is directed to an ionic liquid in which the anionic portion $X^-$ is a boron-containing anion, herein designated $Z^-$. The resulting ionic liquid is thus designated by the general formula $Y^+Z^-$, wherein $Y^+$ is a positively-charged component of the ionic liquid, as described above, and $Z^-$ has a composition of the following formula:

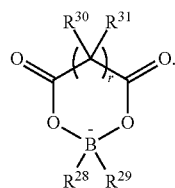

(10)

In Formula (10), $R^{28}$, $R^{29}$, $R^{30}$, and $R^{31}$ are independently selected from H, F, hydrocarbon groups R (which attach to the shown boron atom by a carbon atom), and alkoxy groups —OR. The hydrocarbon group R can be any of the hydrocarbon groups described above, including hydrocarbon groups that are unsubstituted, or substituted with one or more heteroatoms selected from O, N, and S. The subscript r is either 0 (i.e., carbon holding $R^{30}$ and $R^{31}$ is absent) or 1 (i.e., carbon holding $R^{30}$ and $R^{31}$ is present).

In some embodiments of Formula (10), $R^{28}$ and $R^{29}$ are selected from F, hydrocarbon groups R, and alkoxy groups —OR; or $R^{28}$ and $R^{29}$ are selected from F and hydrocarbon groups R; or $R^{28}$ and $R^{29}$ are selected from F and alkoxy groups —OR; or $R^{28}$ and $R^{29}$ are selected from hydrocarbon groups R and alkoxy groups —OR. In particular embodiments, one or both of $R^{28}$ and $R^{29}$ are F, or one or both of $R^{28}$ and $R^{29}$ are alkoxy groups —OR, or one or both of $R^{28}$ and $R^{29}$ are hydrocarbon groups R, or one or both of $R^{28}$ and $R^{29}$ are H.

In some embodiments of Formula (10), $R^{30}$ and $R^{31}$ are selected from H, F, and hydrocarbon groups R, particularly unsaturated hydrocarbon groups, such as an alkenyl or vinylic group. In other embodiments, $R^{30}$ and $R^{31}$ are selected from H and F; or $R^{30}$ and $R^{31}$ are selected from H and hydrocarbon groups R; or $R^{30}$ and $R^{31}$ are selected from H and alkoxy groups —OR; or one or both of $R^{30}$ and $R^{31}$ are F; or one or both of $R^{30}$ and $R^{31}$ are H; or one or both of $R^{30}$ and $R^{31}$ are alkoxy groups —OR; or one or both of $R^{30}$ and $R^{31}$ are hydrocarbon groups R.

When r is 1 in Formula (10), $Z^-$ has a composition of the following formula:

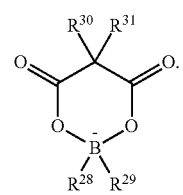

(10a)

When r is 0 in Formula (10), $Z^-$ has a composition of the following formula:

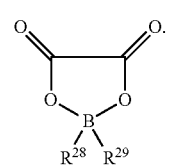

(10b)

In some embodiments, $R^{28}$ and $R^{29}$ in Formula (10) do not interconnect to form a boron-containing ring. In other embodiments, $R^{28}$ and $R^{29}$ interconnect to form a boron-containing ring, which results in a composition of the following formula:

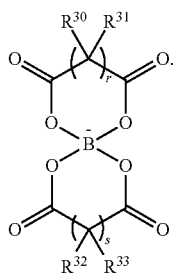

(10c)

In Formula (10c), $R^{30}$, $R^{31}$, and r are defined as provided above, and $R^{32}$ and $R^{33}$ are defined equivalently and independently as provided for $R^{28}$, $R^{29}$, $R^{30}$, and $R^{31}$ under Formula (10). In some embodiments, $R^{32}$ and $R^{33}$ are selected from H, F, and hydrocarbon groups R, particularly unsaturated hydrocarbon groups, such as an alkenyl or vinylic group. In other embodiments, $R^{32}$ and $R^{33}$ are selected from H and F; or $R^{32}$ and $R^{33}$ are selected from H and hydrocarbon groups R; or $R^{32}$ and $R^{33}$ are selected from H and alkoxy groups —OR; or one or both of $R^{32}$ and $R^{33}$ are F; or one or both of $R^{32}$ and $R^{33}$ are H; or one or both of $R^{32}$ and $R^{33}$ are alkoxy groups —OR; or one or both of $R^{32}$ and $R^{33}$ are hydrocarbon groups R. The subscript s is defined equivalently and independently as provided for the subscript r, i.e., r and s are independently 0 or 1.

In one embodiment of Formula (10c), r and s are both 1, which results in $Z^-$ having a composition of the following formula:

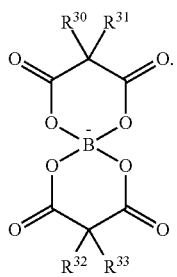

(10c-1)

In a particular embodiment of Formula (10c-1) above, one of $R^{30}$ and $R^{31}$ is H and the other is F; and one of $R^{32}$ and $R^{33}$ is H and the other is F. The resulting anion is herein designated as BFMB. In some embodiments, BFMB is excluded from Formula (10c-1) or from any of the boron-containing formulas provided above.

In another embodiment of Formula (10c), r and s are both 0, which results in $Z^-$ having a composition of the following formula:

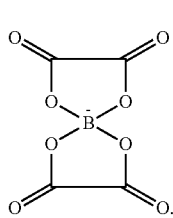

(10c-2)

The above anionic species is herein designated as BOB, and its lithium salt as LiBOB. In some embodiments, any of the foregoing cationic species or salt compounds thereof are excluded, i.e., wherein both r and s in Formula (10c) are not both 0.

In another embodiment of Formula (10c), r and s are 0 and 1, respectively, which results in $Z^-$ having a composition of the following formula:

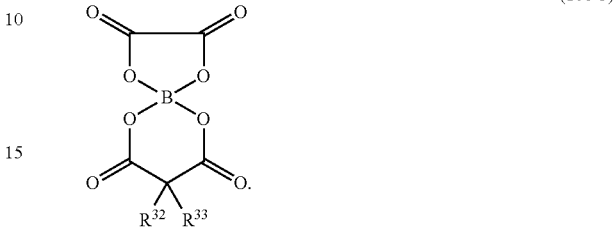

(10c-3)

Some particular exemplary structures of borate anions encompassed by Formula (10) are provided in FIG. 1.

In another aspect, the invention is directed to an electrolyte composition for a lithium ion battery, wherein the electrolyte composition includes one or more of any of the ionic liquids described above and a lithium salt. In one set of embodiments, one or more ionic liquids of the formula $Y^+X^-$ are included in the electrolyte in the absence of an ionic liquid of the formula $Y^+T$. In another set of embodiments, one or more ionic liquids of the formula $Y^+X^-$ are included in admixture with one or more ionic liquids of the formula $Y^+Z^-$ in the electrolyte. In another set of embodiments, one or more ionic liquids of the formula $Y^+Z^-$ are included in the electrolyte in the absence of an ionic liquid of the formula $Y^+X^-$.

The one or more ionic liquids can be included in any suitable amount in the electrolyte. In different embodiments, the ionic liquid is included in an amount of precisely, about, at least, above, up to, or less than, for example, 0.1, 0.5, 1, 2, 3, 4, 5, 10, 15, 20, 25, 30, 35, 40, 45, 50, 60, 70, 80, 90, 95, 98, or 100 wt % by weight of the electrolyte, or an amount within a range bounded by any two of the foregoing exemplary values, wherein the lithium salt is not considered in the wt %. In some embodiments, the one or more ionic liquids are included in an additive amount, which is typically an amount of up to about 20 wt % by weight of the electrolyte. In other embodiments, the one or more ionic liquids are included in a non-additive amount, i.e., an amount over 20 wt %. Generally, an ionic liquid, particularly the boron-containing ionic liquids of the formula $Y^+Z^-$, are included in an additive amount if they facilitate or form a solid electrolyte interphase (SEI) on the anode, typically a graphite electrode. In some embodiments, the electrolyte is composed solely of one or more ionic liquids and a lithium salt (wherein the one or more ionic liquids function as electrolyte solvents). In other embodiments, the electrolyte includes one or more ionic liquids, the lithium salt, and a non-ionic solvent (typically, wherein the one or more ionic liquids function as additives).

The non-ionic solvent, if present, can be any such solvents known in the art that are known to be useful as solvents in a lithium ion battery. The non-ionic solvent typically has a melting point no more or less than 100, 90, 80, 70, 60, or 50° C., and more typically, below room temperature, i.e., below about 25° C., and more typically, up to or less than 20, 15, 10, 5, or 0° C. The non-ionic solvent can be, for example, a carbonate, sulfone, siloxane, silane, ether, ester, nitrile, sulfoxide, or amide solvent, or a mixture thereof. Some examples of carbonate solvents include propylene carbonate (PC), ethylene carbonate (EC), butylene carbonate (BC), dimethyl carbonate (DMC), diethyl carbonate (DEC), dipropyl carbonate (DPC), ethyl methyl carbonate (EMC), methyl propyl carbonate (MPC), ethyl propyl carbonate (EPC), chloroethylene carbonate, and fluorocarbonate solvents (e.g., fluoroethylene carbonate and trifluoromethyl propylene carbonate). Some examples of sulfone solvents include methyl sulfone, ethyl methyl sulfone, methyl phenyl sulfone, methyl isopropyl sulfone (MiPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), diphenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methylsulfonyl)toluene, 2-(methylsulfonyl)ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl(methyl)sulfone and 2-methoxyethoxyethyl(ethyl)sulfone). Some examples of siloxane solvents include hexamethyldisiloxane (HMDS), 1,3-divinyltetramethyldisiloxane, the polysiloxanes, and polysiloxane-polyoxyalkylene derivatives. Some examples of silane solvents include methoxytrimethylsilane, ethoxytrimethylsilane, dimethoxydimethylsilane, methyltrimethoxysilane, and 2-(ethoxy)ethoxytrimethylsilane. Some examples of ether solvents include diethyl ether, 1,2-dimethoxyethane, 1,2-diethoxyethane, 1,3-dioxolane, tetrahydrofuran, 2-methyltetrahydrofuran, tetrahydropyran, diglyme, triglyme, 1,3-dioxolane, and the fluorinated ethers (e.g., mono-, di-, tri-, tetra-, penta-, hexa- and perfluoro derivatives of any of the foregoing ethers). Some examples of ester solvents include 1,4-butyrolactone, ethylacetate, methylpropionate, ethylpropionate, propylpropionate, methylbutyrate, ethylbutyrate, the formates (e.g., methyl formate, ethyl formate, or propyl formate), and the fluorinated esters (e.g., mono-, di-, tri-, tetra-, penta-, hexa- and perfluoro derivatives of any of the foregoing esters). Some examples of nitrile solvents include acetonitrile, propionitrile, and butyronitrile. Some examples of sulfoxide solvents include dimethyl sulfoxide, ethyl methyl sulfoxide, diethyl sulfoxide, methyl propyl sulfoxide, and ethyl propyl sulfoxide. Some examples of amide solvents include formamide, N,N-dimethylformamide, N,N-diethylformamide, acetamide, dimethylacetamide, diethylacetamide, gamma-butyrolactam, and N-methylpyrrolidone. The non-ionic solvent can be included in a non-additive or additive amount, such as any of the exemplary amounts provided above for the ionic liquids.

The non-ionic solvent additive, if present, should typically facilitate formation of a solid electrolyte interphase (SEI) on the anode. The non-ionic solvent additive can be, for example, any of the non-ionic solvent additives described above, but is more typically any such solvent that possesses one or more unsaturated groups containing a carbon-carbon double bond and/or one or more halogen atoms. Some particular examples of solvent additives include vinylene carbonate (VC), vinyl ethylene carbonate, allyl ethyl carbonate, vinyl acetate, divinyl adipate, acrylic acid nitrile, 2-vinyl pyridine, maleic anhydride, methyl cinnamate, ethylene carbonate, halogenated ethylene carbonate, bromobutyrolactone, methyl chloroformate, and sulfite additives, such as ethylene sulfite (ES), propylene sulfite (PS), and vinyl ethylene sulfite (VES). An additive of particular interest herein is vinylene carbonate (VC) or a derivative thereof. In other particular embodiments, the additive is preferably selected from 1,3-propanesultone, ethylene sulfite, propylene sulfite, fluoroethylene sulfite (FEC), α-bromo-γ-butyrolactone, methyl chloroformate, t-butylene carbonate, 12-crown-4 ether, carbon dioxide ($CO_2$), sulfur dioxide ($SO_2$), sulfur trioxide ($SO_3$), acid anhydrides, reaction products of carbon disulfide and lithium, and polysulfide.

In some embodiments, any one or more classes or specific types of non-ionic solvents and/or non-ionic solvent additives are excluded from the electrolyte. In other embodiments, a combination of two or more non-ionic solvents or a combination of two or more non-ionic solvent additives are included in the electrolyte.

The additive is included in an additive amount, such as any of the exemplary amounts provided above for the ionic liquids. The weight percentage of additive is preferably a minimal amount that effectively impacts SEI formation without reducing the electrochemical window by an appreciable extent, i.e., below 5.0V.

The lithium salt can be any of the lithium salts (lithium ion electrolytes) known in the art for use in lithium ion batteries. In one embodiment, the lithium ion electrolyte is non-carbon-containing (i.e., inorganic). For example, the lithium ion electrolyte can be a lithium ion salt of such counteranions as the halides (e.g., chloride, bromide, or iodide), hexachlorophosphate ($PCl_6^-$), hexafluorophosphate ($PF_6^-$), perchlorate, chlorate, chlorite, perbromate, bromate, bromite, periodate, iodate, aluminum fluorides (e.g., $AlF_4$), aluminum chlorides (e.g., $Al_2Cl_7^-$ and $AlCl_4^-$), aluminum bromides (e.g., $AlBr_4^-$), nitrate, nitrite, sulfate, sulfite, phosphate, phosphite, arsenate, hexafluoroarsenate ($AsF_6^-$), antimonate, hexafluoroantimonate ($SbF_6^-$), selenate, tellurate, tungstate, molybdate, chromate, silicate, the borates (e.g., borate, diborate, triborate, tetraborate), tetrafluoroborate, anionic borane clusters (e.g., $B_{10}H_{10}^{2-}$ and $B_{12}H_{12}^{2-}$), perrhenate, permanganate, ruthenate, perruthenate, and the polyoxometallates.

In another embodiment, the lithium ion electrolyte is carbon-containing (i.e., organic). The organic counteranion may, in one embodiment, lack fluorine atoms. For example, the lithium ion electrolyte can be a lithium ion salt of such counteranions as carbonate, the carboxylates (e.g., formate, acetate, propionate, butyrate, valerate, lactate, pyruvate, oxalate, malonate, glutarate, adipate, decanoate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, and the like), the alkoxides (e.g., methoxide, ethoxide, isopropoxide, and phenoxide), the amides (e.g., dimethylamide and diisopropylamide), diketonates (e.g., acetylacetonate), the organoborates (e.g., $BRiR_2R_3R_4^-$, wherein $R_1$, $R_2$, $R_3$, $R_4$ are typically hydrocarbon groups containing 1 to 6 carbon atoms), anionic carborane clusters, the alkylsulfates (e.g., diethylsulfate), alkylphosphates (e.g., ethylphosphate or diethylphosphate), dicyanamide (i.e., $N(CN)_2^-$), and the phosphinates (e.g., bis-(2,4,4-trimethylpentyl)phosphinate). The organic counteranion may, in another embodiment, include fluorine atoms. For example, the lithium ion electrolyte can be a lithium ion salt of such counteranions as the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonimides (e.g., $(CF_3SO_2)_2N^-$), including any of these types of anions described above under Formula (9).

In some embodiments, any one or more classes or specific types of lithium salts are excluded from the electrolyte. In other embodiments, a combination of two or more lithium salts are included in the electrolyte.

The lithium ion electrolyte is incorporated in the electrolyte medium preferably in an amount which imparts a suitable concentration of lithium ions and suitable level of conductivity to the electrolyte medium. The conductivity of the electrolyte medium can be, for example, at least 0.01 mS/cm (0.001 S/m) at an operating temperature of interest, and particularly at a temperature within 20-60° C. In different embodiments, the lithium ion electrolyte is present in the electrolyte in a concentration of precisely, about, at least, above, up to, or less than, for example, 0.1, 0.5, 1.0, 1.2, 1.5, 1.8, 2, 2.5, or 3 M, where "M" indicates a molarity concentration.

In another aspect, the invention is directed to a lithium ion battery containing any of the electrolyte compositions described above. The lithium ion battery may contain any of the components typically found in a lithium ion battery, including positive and negative electrodes, current collecting plates, a battery shell, such as described in, for example, U.S. Pat. Nos. 8,252,438, 7,205,073, and 7,425,388, the contents of which are incorporated herein by reference in their entirety. The positive electrode can be, for example, a lithium metal oxide, wherein the metal is typically a transition metal, such as Co, Fe, Ni, or Mn, or combination thereof. Some examples of positive electrode materials include $LiCoO_2$, $LiNiCoO_2$, $LiMnO_2$, and $LiFePO_4$. To improve conductivity at the positive electrode, conductive carbon material (e.g., carbon black, carbon fiber, or graphite) is typically admixed with the positive electrode material. The negative electrode is typically a carbon-based composition in which lithium ions can intercalate or embed, such as graphite (e.g., natural or artificial graphite), petroleum coke, carbon fiber (e.g., mesocarbon fibers), or carbon (e.g., mesocarbon) microbeads. The positive and negative electrode compositions are typically admixed with an adhesive (e.g., PVDF, PTFE, and co-polymers thereof) in order to be properly molded as electrodes. Typically, positive and negative current collecting substrates (e.g., Cu or Al foil) are also included. The assembly of lithium ion batteries is well known in the art.

In yet another aspect, the invention is directed to a method of operating a lithium ion battery that contains any of the electrolyte compositions described above. The operation of lithium ion batteries is well known in the art.

Examples have been set forth below for the purpose of illustration and to describe certain specific embodiments of the invention. However, the scope of this invention is not to be in any way limited by the examples set forth herein.

EXAMPLES

Preparation and Analysis of Functionalized Bis(Malonato)Borate (BMB) Ionic Liquids and Electrolytes General Methods All reactions that involve the trimethylsilyl functional groups were conducted under an argon atmosphere. All of the solvents were of anhydrous grade (moisture less than 50 ppm) and were used without further purification. All reagents were used as received unless specified. $LiB(OCH_3)_4$ and 3-(trimethylsilyl)-2-oxazolidinone were synthesized according to literature procedures (Barthel, J., et al., *Journal of the Electrochemical Society* 1996, 143, 3572-3575; and Palomo, C., *Synthesis* 1981, 1981, 809, 811). All of the preparation and purification involving compounds 5, 6, 7 and 8 were performed in an argon filled glovebag. $^1H$ NMR spectra were recorded on a Bruker Avance 400 MHz spectrometer, and $^7Li$, $^{11}B$, and $^{19}F$ NMR spectra were recorded on the same Bruker spectrometer. The chemical shifts were reported in ppm relative to tetramethylsilane (TMS) or residual protiated solvent peaks in $^1H$ NMR spectra. $LiBF_4$ in DMSO-$d_6$ was used as an external standard for both $^7Li$, $^{11}B$, and $^{19}F$ NMR.

A general schematic of the synthesis of the di(trimethylsilyl)malonates is provided as follows:

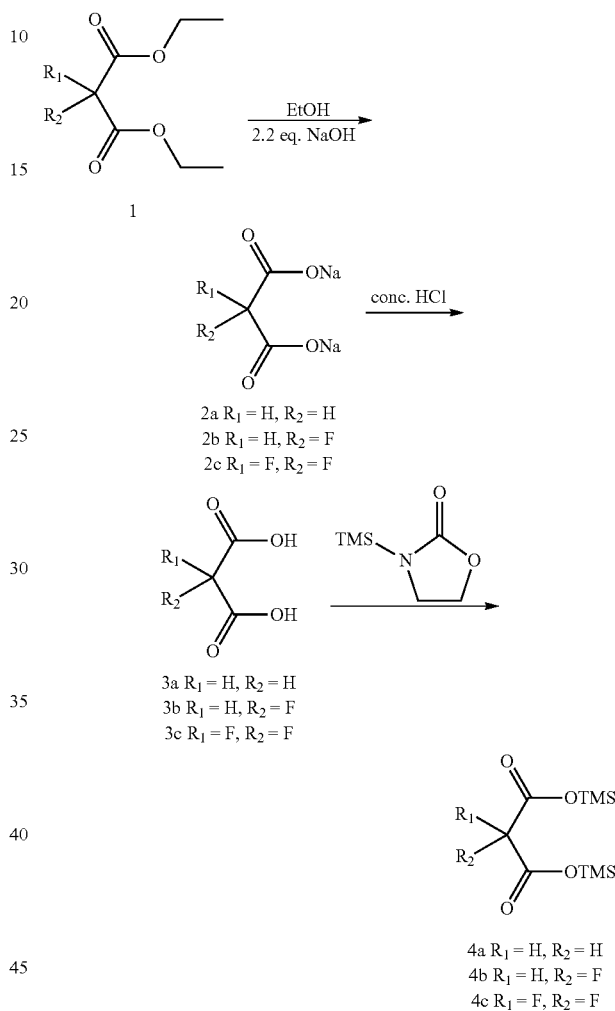

General Preparation of 2

The preparation of 2 used a modified procedure of that described in Horwitz, C. P., et al., U.S. Pat. No. 7,060,818. Namely, 45 g of sodium hydroxide was dissolved in 250 mL of water followed by dilution with 1000 mL of ethanol. The solution was then heated to 60° C. Diethyl fluoromalonate or diethyl difluoromalonate (100 g) was then added via addition funnel to the stirred solution, and a white precipitate formed immediately. The mixture was stirred for another 45 minutes while the temperature was maintained at 60° C. The fine white precipitate was collected by fitted funnel and dried at 50° C. in vacuo overnight to remove the ethanol. The drying step was found to be critical for the success of the next step, since residual ethanol can interfere with the acidic hydrolysis and reduce the yield. Yield: quantitative.

2b Yield: quantitative. $^1H$ NMR (CDCl$_3$, 400 MHz) δ PPM: 4.92 (d, 1H, $^2J_{HF}$=53.2 Hz). $^{13}C$ NMR (Acetone-d$_6$, 100 MHz) δ PPM: 172.9 (d, $^2J_{CF}$=21.2 Hz), 89.75 (d, $^2J_{CF}$=185

Hz). Fast deuterium exchange occurred in $D_2O$ because of the acidity of $D_2O$; therefore, the $^{13}C$ NMR spectrum of 2b was measured in acetone-$d_6$.

+NaOD

2c Yield: quantitative. $^{13}C$ NMR ($D_2O$, 100 MHz) δ PPM: 169.0 (t, $^2J_{CF}$=28.8 Hz), 109.4 (t, $^1J_{CF}$=256 Hz).

General Preparation of 3

The dry sodium fluoromalonate or sodium difluoromalonate was dissolved in a large excess of concentrated HCl solution and the resulting heterogeneous solution stirred at room temperature overnight. After the reaction was completed, the HCl was removed by vigorously bubbling nitrogen through the solution, followed by rotavapping at 80° C. The concentrated liquid was dissolved in 500 mL ether and the precipitated NaCl was filtered.

3b Yield: 90%. $^1H$ NMR (Acetone-$d_6$, 400 MHz) δ PPM: 8.47 (s, 2H), 5.82 (d, $^2J_{HF}$=48 Hz). $^{13}C$ NMR ($CD_3CN$, 100 MHz) δ PPM: 165.2 (d, $^2J_{CF}$=24.3 Hz), 84.98 (d, $^1J_{CF}$=190.3 Hz).

3c Yield: 80%. $^1H$ NMR (Acetone-$d_6$, 400 MHz) δ PPM: 10.35 (s, 2H). $^{13}C$ NMR ($CD_3CN$, 100 MHz) δ PPM: 161.03 (t, $^2J_{CF}$=30.4 Hz), 106.2 (t, $^1J_{CF}$=256.5 Hz).

General Preparation of 4

Method A: A mixture of malonic acid and trimethylsilyl chloride was heated to reflux at 60° C. for 4 days. The excess TMSCl was removed by rotavap and the crude product was distilled under reduced pressure (60° C. at 1 torr). 4a Yield: 30%. $^1H$ NMR ($CDCl_3$, 400 MHz) δ PPM: 3.72 (s, 2H), 0.68 (s, 18H). $^{13}C$ NMR ($CDCl_3$, 100 MHz) δ PPM: 167.1. 44.9, −0.33.

Method B: A modified procedure of the process described in Palomo, C., *Synthesis*, 1981, 809-811 was used. In a 250 mL round-bottomed flask was placed 8.6 g of 2-fluoro-propanedioic acid and 70 mL of carbon tetrachloride. The mixture was heated to reflux temperature for 15-20 minutes. The mixture was then cooled to 0-5° C. and the precipitated 2-oxazolidinone was filtered in the absence of moisture. The solvent was evaporated and the crude product was distilled under reduced pressure. 4b Yield: 60%. b.p. of 65° C. at 1 torr. $^1H$ NMR ($CDCl_3$, 400 MHz) δ PPM: 5.55 (d, 1H, $^2J_{FIF}$=49.0), 0.70 (s, 18H). $^{13}C$ NMR ($CDCl_3$, 100 MHz) δ PPM: 163.76 (d, $^2J_{CF}$=24.5 Hz), 86.2 (d, $^1J_{CF}$=194.7 Hz), −0.35. 4c Yield: 55%. b.p. of 55° C. at 1 torr. $^1H$ NMR ($CDCl_3$, 400 MHz) δ PPM: 0.7 (s, 18Hs). $^{13}C$ NMR ($CDCl_3$, 100 MHz) δ PPM: 160.3 (t, $^2J_{CF}$=31.5 Hz), 106.0 (t, $^1J_{CF}$=260.0 Hz), −0.72.

General Preparation of 5

A general schematic of the synthesis of fluorine-substituted lithium bis(malonato)borate is provided as follows:

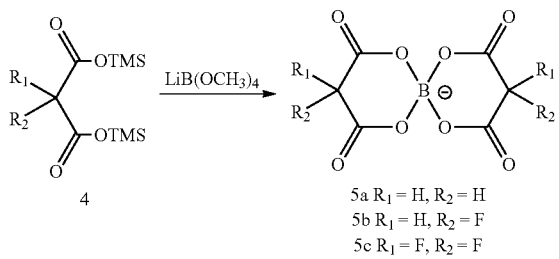

5a $R_1$ = H, $R_2$ = H
5b $R_1$ = H, $R_2$ = F
5c $R_1$ = F, $R_2$ = F

A modified procedure of the process described in Sun, X.-G., et al., *Macromolecules*, 2004, 37, 2219-2227 was used. $LiB(OCH_3)_4$ (one equivalent) and bis(trimethylsilyl) malonate (two equivalents) were mixed in argon-saturated anhydrous acetonitrile and heated at 45-50° C. in an oil bath for 24 hours. After the reaction was completed, the solvent was removed by rotary evaporation at 50° C. before drying in an oven at 75° C. for 24 hours. The white salt was repeatedly recrystallized from anhydrous acetonitrile/toluene mixture in an argon-filled glove bag to avoid possible decomposition of the LiBMB salt by moisture. The recrystallized product was dried under vacuum at 85° C. in vacuo for two days. The purity of the salts was confirmed by $^{11}B$, $^{19}F$ and $^7Li$ NMR.

5a Yield: 61%. $^1H$ NMR (DMSO-$d_6$, 400 MHz) δ PPM: 3.4 (s, 4H). $^{11}B$ NMR (DMSO-$d_6$, 128.4 MHz) δ PPM. $^{19}F$ NMR (DMSO-$d_6$, 376 MHz) δ PPM: −16.57. $^7Li$ NMR (DMSO-$d_6$, 155.4 MHz) δ PPM: 0.

5b Yield: 39%. $^1H$ NMR (DMSO-$d_6$, 400 MHz) δ PPM: 6.14 (dd, $^2J_{HF}$=43.6). $^{11}B$ NMR (DMSO-$d_6$, 128.4 MHz) δ PPM: −18.18. $^{19}F$ NMR (DMSO-$d_6$, 376 MHz) δ PPM: 205.2 (d, $^2J_{FH}$=43.9). $^7Li$ NMR (DMSO-$d_6$, 155.4 MHz) δ PPM: 0.

5c Yield: 13%. $^{11}B$ NMR (DMSO-$d_6$, 128.4 MHz) δ PPM: −18.73. $^{19}F$ NMR (DMSO-$d_6$, 376 MHz) δ PPM: −109.53. $^7Li$ NMR (DMSO-$d_6$, 155.4 MHz) δ PPM: 0.

General Preparation of 6

A general schematic of the synthesis of fluorine-substituted lithium malonate(difluoro)borate is provided as follows:

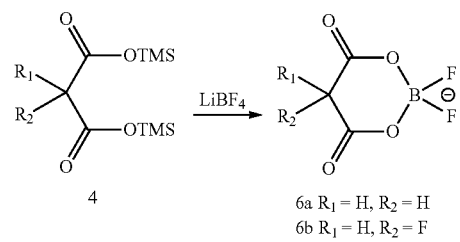

6a $R_1$ = H, $R_2$ = H
6b $R_1$ = H, $R_2$ = F

A modified procedure of the process described in Schreiner, C., et al., *Chemistry-A European Journal*, 2009, 15, 2270-2272 was used. 3 g of $LiBF_4$ was dissolved in 50 mL of acetonitrile. 8 g of bis(trimethylsilyl)malonate was added within 7 hours at 40-45° C. via a syringe pump. Stirring at 40-45° C. was continued for one day, and acetonitrile removed by vacuum, before drying the product at 45° C. at 1 torr overnight and for another day. The salt was transferred into an Ar-filled glove-bag and was purified by recrystallization from acetonitrile/toluene mixture as white powder.

6a Yield: 24%. $^1H$ NMR (DMSO-$d_6$, 400 MHz) δ PPM: 3.41. $^{11}B$ NMR (DMSO-$d_6$, 128.4 MHz): −16.59. $^{19}F$ NMR (DMSO-$d_6$, 376 MHz) δ PPM: −109.35. $^7Li$ NMR (DMSO-$d_6$, 155.4 MHz): 0.

6b Yield: 57% $^1H$ NMR (DMSO-$d_6$, 400 MHz) δ PPM: 5.795 (d, $^2J_{HF}$=44.9). $^{11}B$ NMR (DMSO-$d_6$, 128.4 MHz): −19.55 to −19.77, (dd). $^{19}F$ NMR (DMSO-$d_6$, 376 MHz) δ PPM: −204.95 (d, $^2J_{FH}$=44.5 Hz), −153.17 to −153.48 (ddd), −144.32 to −144.69 (ddd).

Preparation of 7, 8, and 9

A general schematic of the synthesis of bis(fluoromalonato)borate (BFMB)ionic liquids of the formulas 7, 8, and 9 is provided as follows:

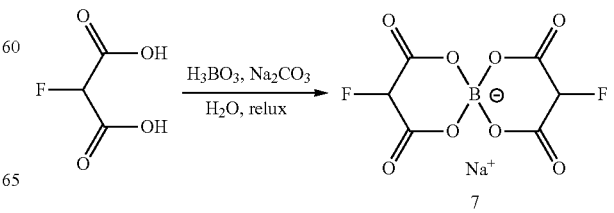

7

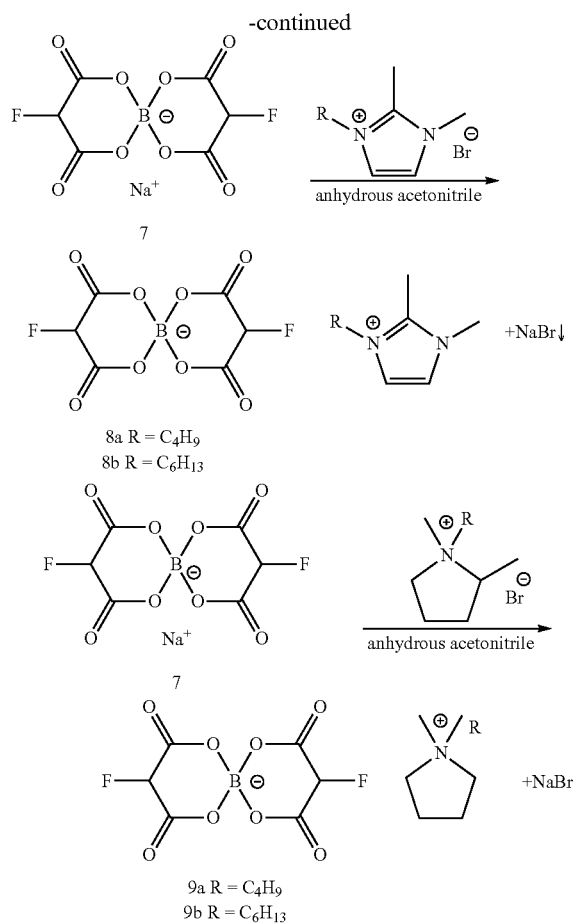

Preparation of 7:

A modified procedure of the process described in Wietelmann, U., et al., Chemetall G.m.b.H., Germany, 2002, p. 28 was used. 10 g of fluoromalonic acid (3b) and 2.54 g of boric acid were dissolved in 20 mL of water. 2.17 g of sodium carbonate was added slowly to the aqueous solution under stirring. After the gas formation slowed down, the solution was heated to 90° C. for 0.5 hours. The water was later rotavapped. The white solid was transferred into an Ar-filled glove-bag, removed from the flask, ground in a mortar and purified by repeated crystallization from acetonitrile. The salts were dried in a vacuum oven at 100° C. for two days. Yield: 80%. $^{1}$H NMR (DMSO-$d_6$, 400 MHz) δ PPM: 6.07 (d, $^{2}J_{HF}$=43.6 Hz). $^{11}$B NMR (DMSO-$d_6$, 128.4 MHz) δ PPM: −18.18. $^{19}$F NMR (DMSO-$d_6$, 376 MHz) δ PPM: −64.91 ($^{2}J_{HF}$=44.4 Hz). $^{23}$Na NMR (DMSO-$d_6$, 105.8 MHz) δ PPM: 0.

Preparation of 8:

The imidazolium salt was stirred at room temperature with excess orthoborate salt in anhydrous acetonitrile under argon for three days to allow the chloride to react completely. After cooling, the flask was transferred to an Ar-filled glove-bag and the alkali halide precipitates filtered off. The solvent in the filtrate was evaporated on a rotavapor at reduced pressure. The residue was freeze dried overnight and then dissolved in 20 mL of dichloromethane. The solution was allowed to stand at room temperature (RT) overnight in order to induce in dichloromethane. After filtration and evaporation of the solvent, the residue was further freezed dried and stored in a glove box. Excellent purity of the resulting orthoborate ionic liquid was confirmed by $^{1}$H, $^{11}$B, and $^{19}$F NMR. No peak was observed in the $^{23}$Na NMR spectrum.

8a Yield: 30%. $^{1}$H NMR (DMSO-$d_6$, 400 MHz) δ PPM: 7.64-7.66 (m, 2H), 6.063 (d, $^{2}J_{HF}$=45.2 Hz), 4.44 (t, 2H), 4.1 (s, 3H), 2.91 (s, 3H), 2.11-2.16 (m, 2H), 1.72-1.78 (m, 2H), 1.36 (t, 3H). $^{11}$B NMR (DMSO-$d_6$, 128.4 MHz) δ PPM: −17.99. $^{19}$F NMR (DMSO-$d_6$, 376 MHz) δ PPM: −66.59 (d, $^{2}J_{HF}$=45.3 Hz). $^{23}$Na NMR (DMSO-$d_6$, 105.8 MHz) δ PPM: No peaks.

8b Yield: 40%. $^{1}$H NMR (DMSO-$d_6$, 400 MHz) δ PPM: 8.02 (m, 2H), 6.47 (d, $^{2}J_{HF}$=43.6 Hz), 4.49 (t, 2H), 4.14 (s, 3H), 2.97 (s, 3H), 2.09 (m, 2H), 1.66 (m, 6H), 1.26 (t, 3H). $^{11}$B NMR (DMSO-$d_6$, 128.4 MHz) δ PPM: −17.99. $^{19}$F NMR (DMSO-$d_6$, 376 MHz) δ PPM: −64.918 (d, $^{2}J_{HF}$=43.8 Hz). $^{23}$Na NMR (DMSO-$d_6$, 105.8 MHz) δ PPM: No peaks.

Preparation of 9:

The pyrrolidinium salt was stirred at room temperature with excess orthoborate salt in anhydrous acetonitrile under argon for three days to allow the chloride to react completely. After cooling, the flask was transferred to an Ar-filled glove-bag and the alkali halide precipitates filtered off. The solvent in the filtrate was evaporated on a rotavapor at reduced pressure. The residue was freeze dried overnight and then dissolved in 20 mL of dichloromethane. The solution was allowed to stand at RT overnight in order to induce precipitation in dichloromethane. After filtration and evaporation of the solvent, the residue was further freezed dried and stored in a glove box. Excellent purity of the resulting orthoborate ionic liquid was confirmed by $^{1}$H, $^{11}$B, and $^{19}$F NMR. No peak was observed present in the $^{23}$Na NMR spectrum.

9a Yield: 30%. $^{1}$H NMR (DMSO-$d_6$, 400 MHz) δ PPM: 6.07 (d, $^{2}J_{HF}$=45.2 Hz), 3.80-3.85 (m, 4H), 3.61-3.65 (m, 2H), 3.35 (s, 3H), 2.56 (s, 4H), 2.09-2.17 (m, 4H), 1.75-1.82 (m, 4H), 1.37 (t, 3H). $^{11}$B NMR (DMSO-$d_6$, 128.4 MHz) δ PPM: −17.99 (s). $^{19}$F NMR (DMSO-$d_6$, 376 MHz) δ PPM: −66.55 (d, $^{2}J_{HF}$=43.98 Hz). $^{23}$Na NMR (DMSO-$d_6$, 105.8 MHz) δ PPM: No peaks.

9b Yield: 30%. $^{1}$H NMR (DMSO-$d_6$, 400 MHz) δ PPM: 6.06 (d, 2H, $^{2}J_{HF}$=43.6 Hz), 3.78-3.84 (m, 4H), 3.6-3.64 (m, 2H), 3.34 (s, 3H), 2.55-2.57 (m, 4H), 2.14 (m, 2H), 1.74 (s, 6H), 1.32 (t, 3H). $^{11}$B NMR (DMSO-$d_6$, 128.4 MHz) δ PPM: −17.99. $^{19}$F NMR (DMSO-$d_6$, 376 MHz) δ PPM: −66.55 (d, $^{2}J_{HF}$=44.52 Hz). $^{23}$Na NMR (DMSO-$d_6$, 105.8 MHz) δ PPM: No Peaks.

Results and Discussion

Figure 2A:
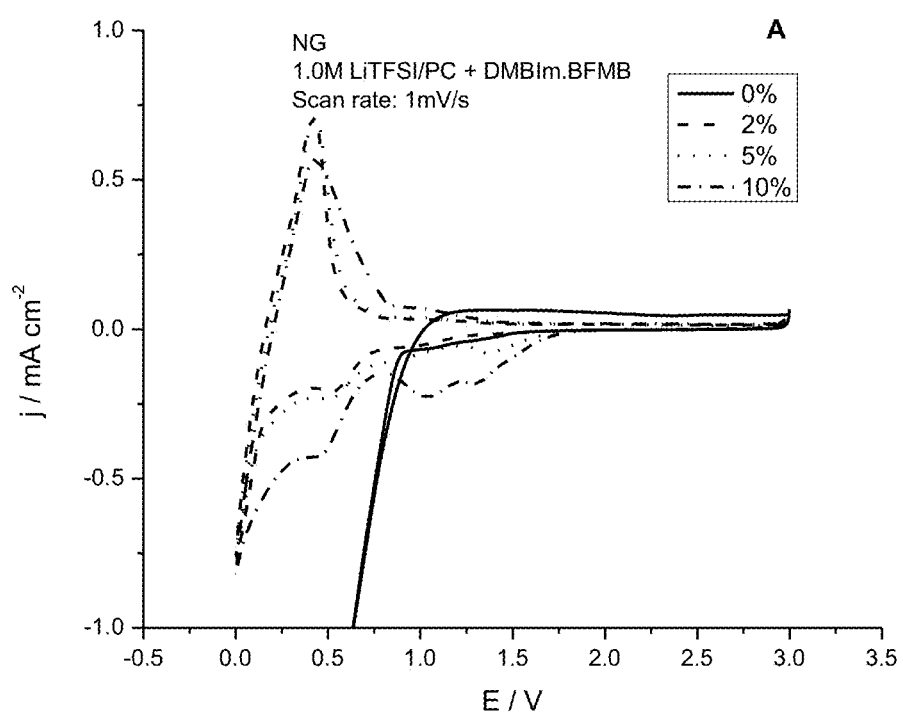
FIGS. 2A, 2B. a) cyclic voltammetry trace of 1.0M LiTFSI/PC containing different amounts of DMBIm.BFMB on graphite working electrode at a scan rate of 1 mV/s (Li as counter and reference electrode), FIG. 2A; b) cycling performance of NG∥Li half cells using 1.0M LiTFSI/PC with 2 wt % DMBIm.BFMB, FIG. 2B.
Figure 2B:
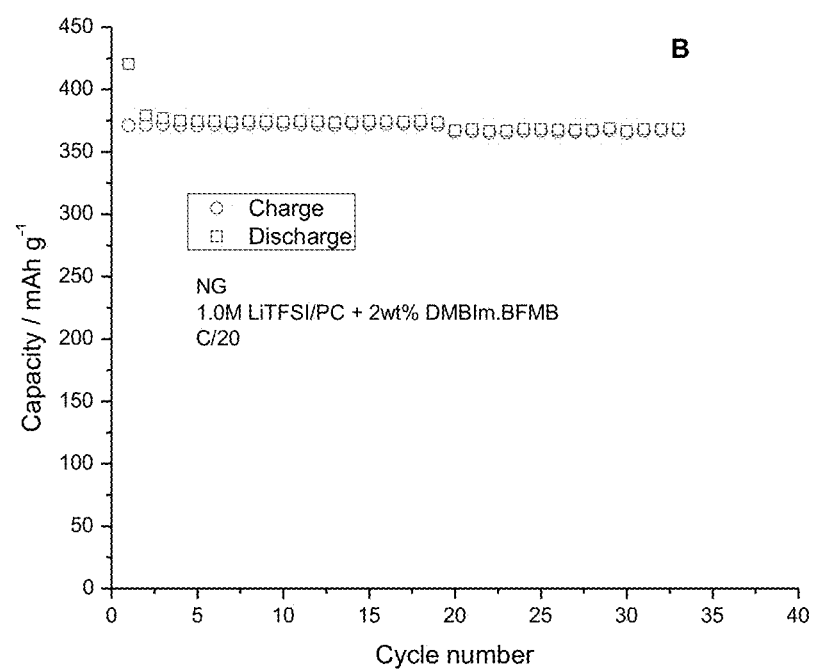

FIG. 2A shows cyclic voltammetry of 1.0M LiTFSI/PC with different amounts of DMBIm.BFMB on the graphite working electrode at a scan rate of 1 mV s$^{-1}$. Without the additive, only PC co-intercalation and decomposition peak were observed. However, with a minimum of 2 wt % DMBIm.BFMB as additive, the reversible lithium deposition/stripping peaks were observed. FIG. 2B shows the cycling performance of the NG∥Li half-cell using 1.0M LiTFSI/PC as electrolyte with 2 wt % DMBIm.BFMB as additive (where NG refers to natural graphite). A high reversible capacity of 370 mAh g$^{-1}$ was obtained under the current density of C/20.

Figure 3A:
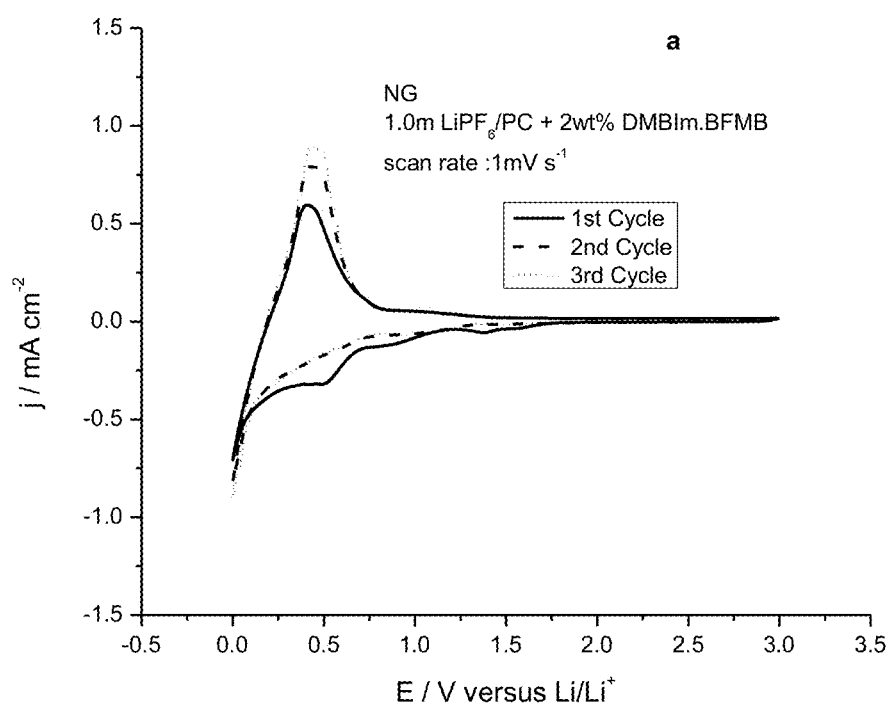
FIGS. 3A-3D. a) cyclic voltammetry trace of 1.0M $LiPF_6$/PC with 2 wt % DMBIm.BFMB, FIG. 3A; b) graph plotting charge/discharge capacities and coulombic efficiencies of the NG∥Li half cells using 1.0M $LiPF_6$/PC with 2 wt % and 5 wt % DMBIm.BFMB, FIG. 3B; c) graph plotting rate capabilities of NG∥Li half cell using 1.0M $LiPF_6$/PC with 5 wt % DMBIm.BFMB, FIG. 3C; d) graph plotting charge/discharge capacities and coulombic efficiencies of the $LiNi_{0.5}Mn_{1.5}O_4$∥Li half cells using 1.0M $LiPF_6$/PC with 5 wt % DMBIm.BFMB, FIG. 3D.
Figure 3B:
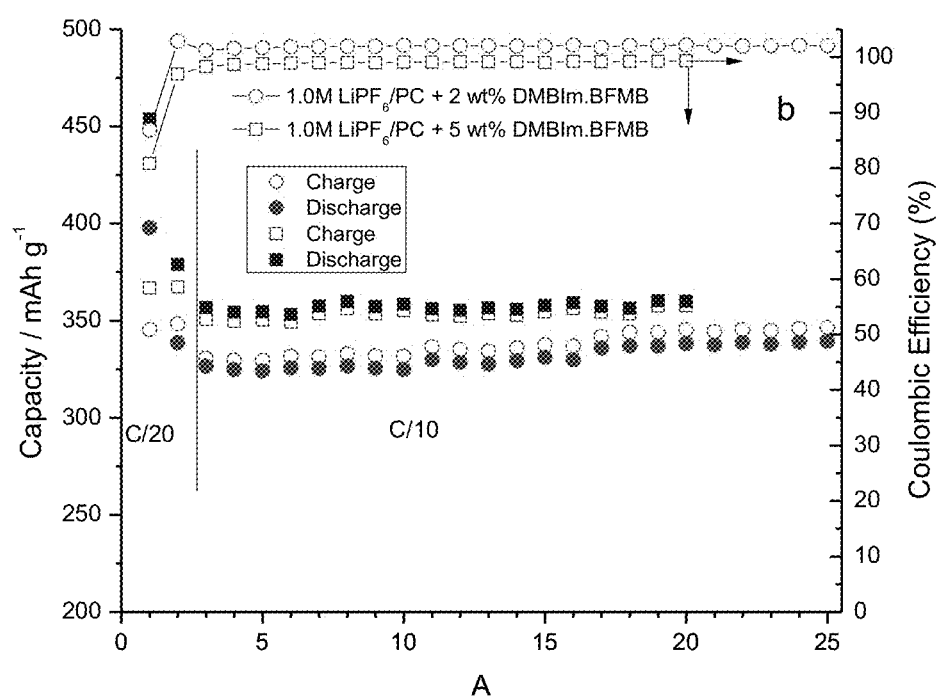
Figure 3C:
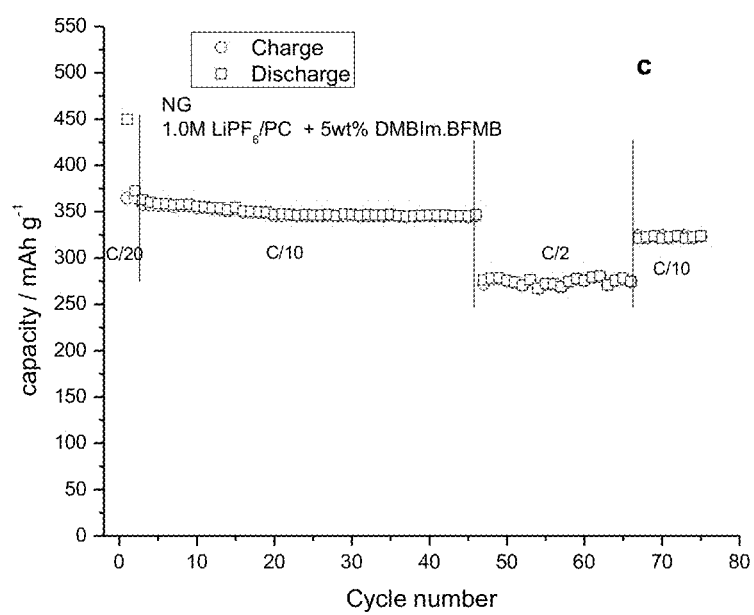
Figure 3D:
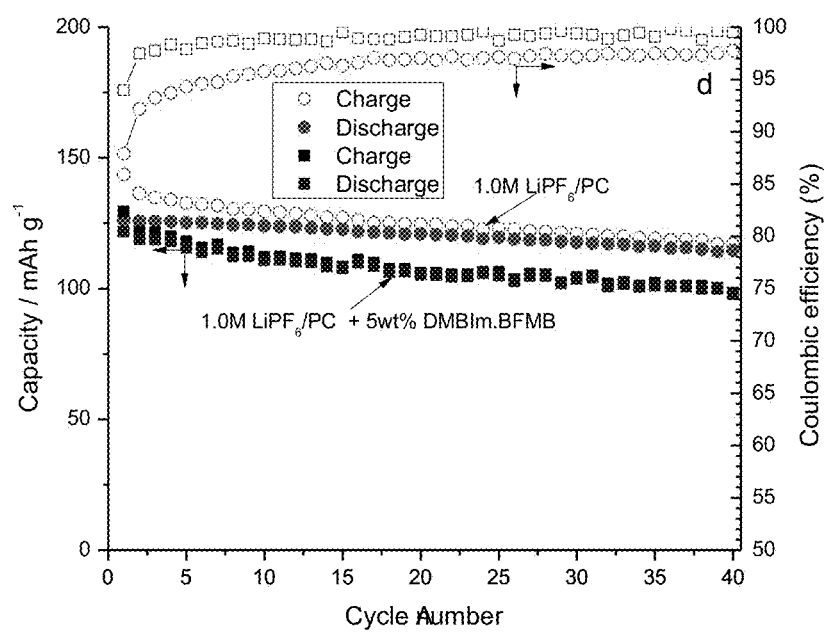

DMBIm.BFMB as additive was also added to the electrolyte using a conventional lithium salt (LiPF$_6$) in PC. FIG. 3A shows the typical cyclic voltammetry of 1.0M LiPF$_6$/PC with 2 wt % of DMBIm.BFMB on the graphite working electrode at a scan rate of 1 mV s$^{-1}$. FIG. 3B is a graph plotting charge/discharge capacities and coulombic efficiencies of the NG∥Li half cells using 1.0M LiPF$_6$/PC with 2 wt % and 5 wt % DMBIm.BFMB. As in the case of 1.0M LiTFSI/PC, 2 wt % of DMBIm.BFMB seems enough to preclude PC co-intercalation and graphite exfoliation. However, a surprising result is that the coulombic efficiency of NG‖Li half-cell using 2 wt % DMBIm.BFMB as additive is higher than 100%, which indicates that more current was consumed during the charge process. The foregoing result may be attributable at least in part to some PC getting co-intercalated into the graphite without causing its exfoliation. This is supported by the observation that, with two of the half cells assembled, one worked well while the other did not. Therefore, 5 wt % DMBIm.BFMB was used for 1.0M LiPF$_6$/PC solution. FIG. 3C is a graph plotting the rate capabilities of a NG‖Li half cell using 1.0M LiPF$_6$/PC with 5 wt % DMBIm.BFMB. Shown in FIG. 3C is the rate capability of this electrolyte in NG‖Li half cells, with current rate changing from C/20 to C/10, C/2, and C/10, with excellent capacity retention. Furthermore, when tested in half cells based on high voltage cathode LiNi$_{0.5}$Mn$_{1.5}$O$_4$, the cell with 5 wt % DMBIm.BFMB as additive exhibited a coulombic efficiency close to 100% after three cycles while that without additive exhibited a coulombic efficiency around 98% after 15 cycles, even though the cell with additive had a slightly lower capacity than the cell without additive (FIG. 3D).

Figure 4A:
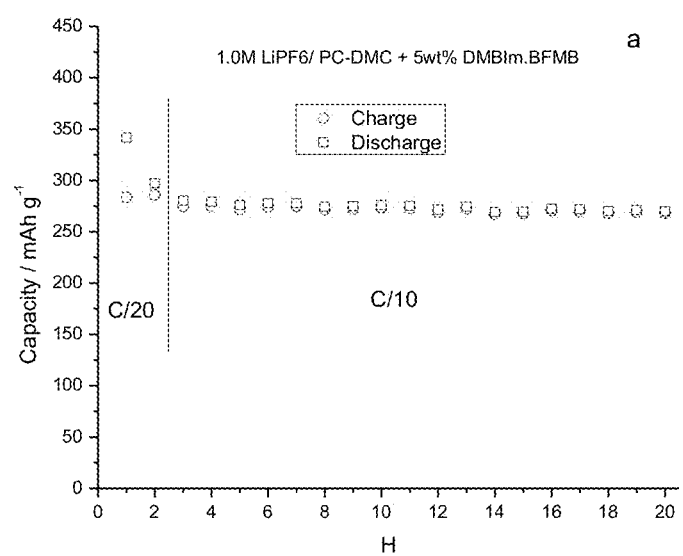
FIGS. 4A, 4B. a) charge/discharge capacities of NG∥Li half cells using 1.0M $LiPF_6$/PC with 5 wt % DMBIm.BFMB, FIG. 4A; b) charge/discharge capacities of $LiNi_{0.5}Mn_{1.5}O_4$∥Li half cells using 1.0M $LiPF_6$/PC with 5 wt % DMBIm.BFMB, FIG. 4B.
Figure 4B:
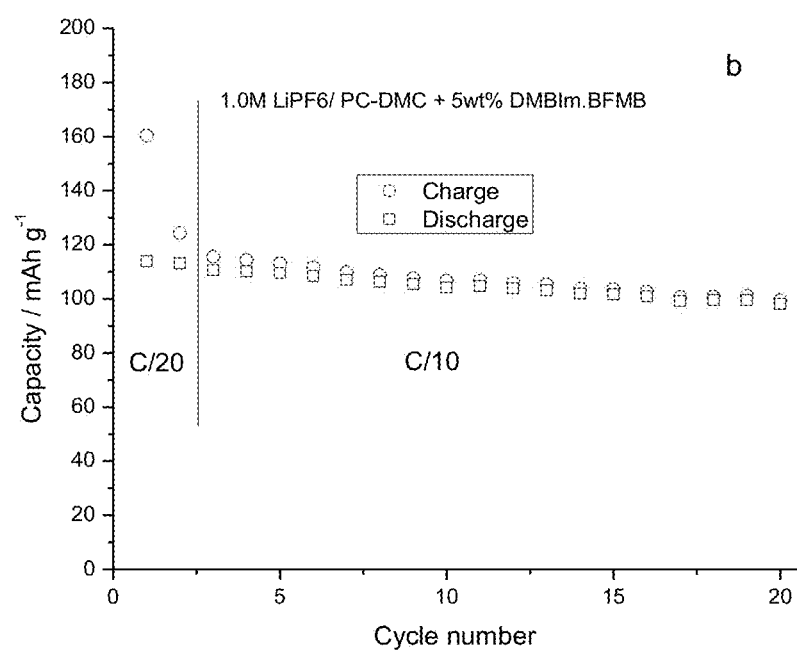

Since commercial electrolyte is typically a mixture of either EC with DMC, DEC, or EMC, here DMC was selected as a co-solvent for PC to test the additive effect. FIGS. 4A and 4B show the cycling performance of half cells of NG‖Li and LiNi$_{0.5}$Mn$_{1.5}$O$_4$‖Li using electrolyte of 1.0M LiPF$_6$/PC with 5 wt % DMBIm.BFMB as additive. Both cells worked fine under the current rate of both C/20 and C/10.

Figure 5A:
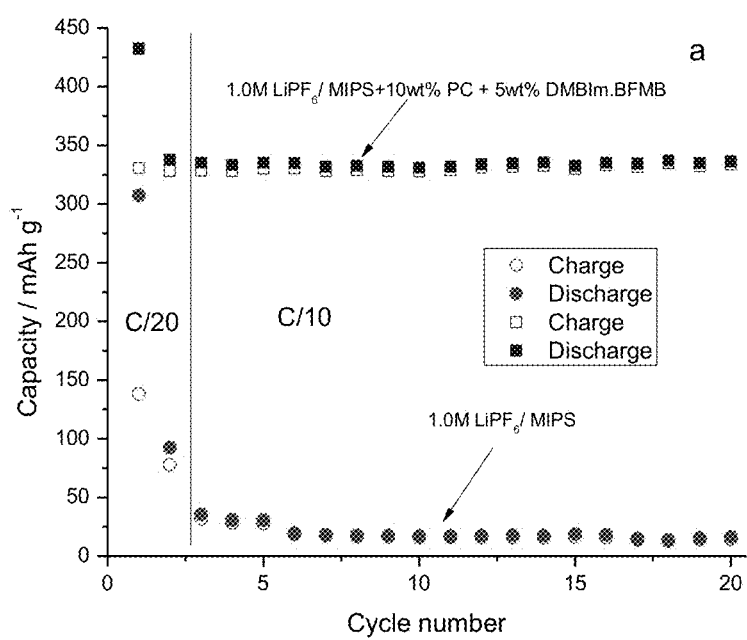
FIGS. 5A, 5B. a) graph comparing discharge/charge capacities of the NG∥Li half cells based on 1.0M $LiPF_6$/MiPS, with and without ionic liquid additive under different current densities, FIG. 5A; b) graph plotting discharge/charge capacities of the $LiNi_{0.5}Mn_{1.5}O_4$∥Li half cells based on 1.0M $LiPF_6$/MiPS with ionic liquid additive under different current densities, FIG. 5B.
Figure 5B:
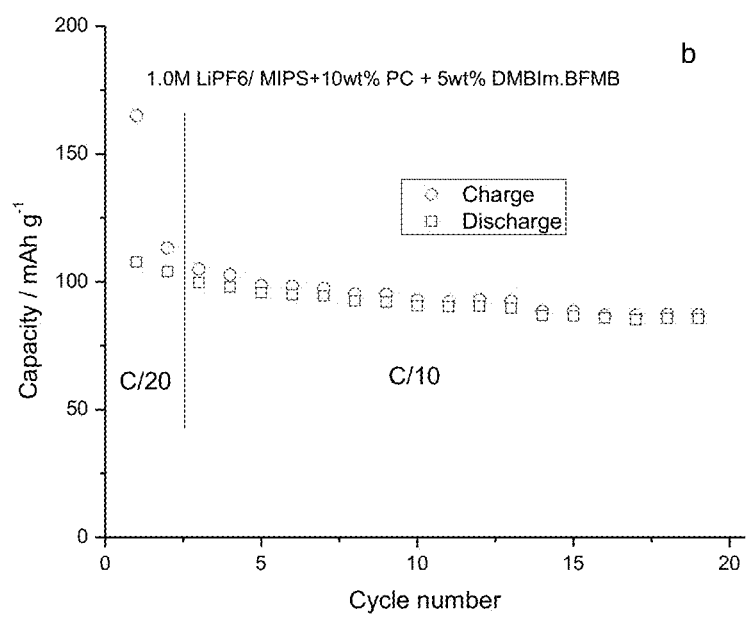

To further test the effectiveness of the additive, other electrolytes that are known to be incompatible with graphite electrode, such as alkyl sulfones, were used. Here methyl isopropyl sulfone (MiPS) was selected to make a 1.0M LiPF$_6$/MiPS electrolyte. As shown in FIG. 5A, under s current rate of C/10 a stable reversible capacity of 323 mAh g$^{-1}$ was obtained in the NG‖Li half-cell using 1.0M LiPF$_6$/MiPS with 5 wt % DMBIm.BFMB as additive. In contrast, a low capacity of 31 mAh g$^{-1}$ is obtained for the cell based on pure sulfone electrolyte, which decays quickly with cycling. FIG. 5B shows the cycling performance of the LiNi$_{0.5}$Mn$_{1.5}$O$_4$‖Li half-cell using 1.0M LiPF$_6$/MiPS with 5 wt % DMBIm.BFMB as additive. Under the same current rate of C/10, the cell was found to have a lower capacity as compared with that based on PC electrolyte, which can be attributed to its relatively high viscosity.

Figure 6A:
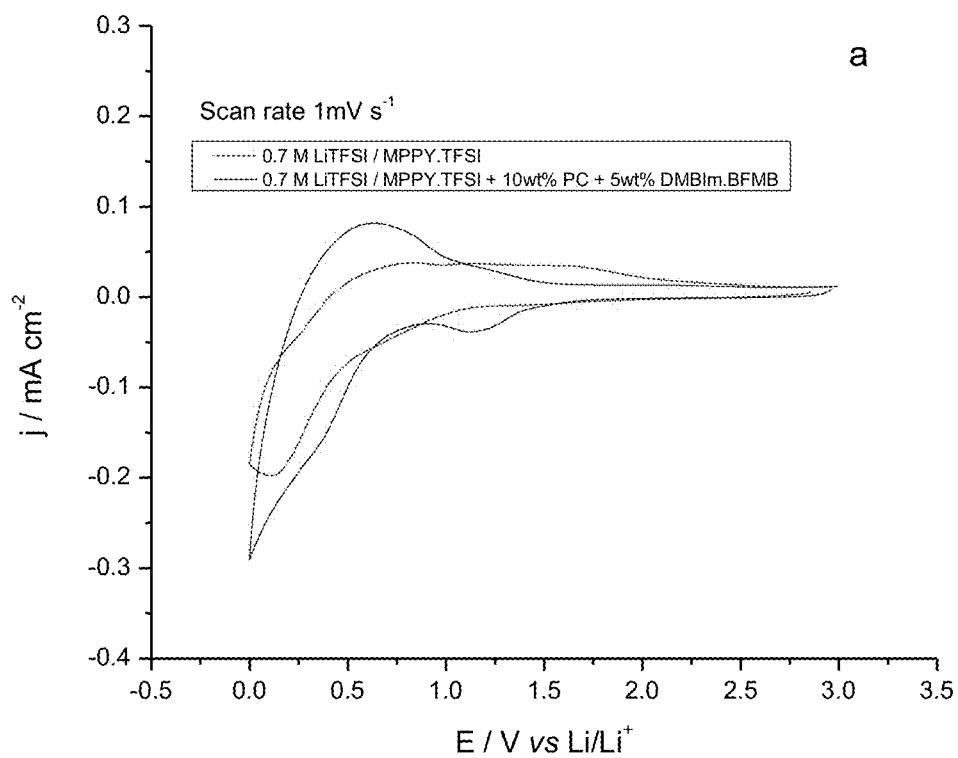
FIGS. 6A-6C. a) cyclic voltammetry trace of 0.7M LiTFSI/MPPY.TFSI with and without 10 wt % PC and 5 wt % DMBIm.BFMB on graphite working electrode at a scan rate of 1 mV/s (Li as counter and reference electrode), FIG. 6A; b) graph comparing cycle performance of NG∥Li half-cell using 0.7M LiTFSI/MPPY.TFSI with and without 10 wt % PC and 5 wt % DMBIm.BFMB at a current rate of C/20, FIG. 6B; c) graph plotting rate capability of NG∥Li half-cell using 0.7M LiTFSI/MPPY.TFSI with 10 wt % PC and 5 wt % DMBIm.BFMB, FIG. 6C.
Figure 6B:
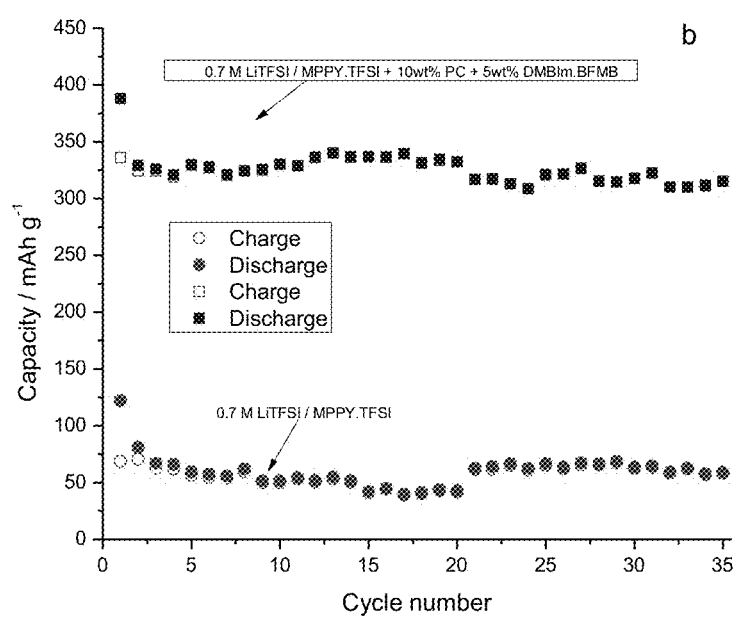
Figure 6C:
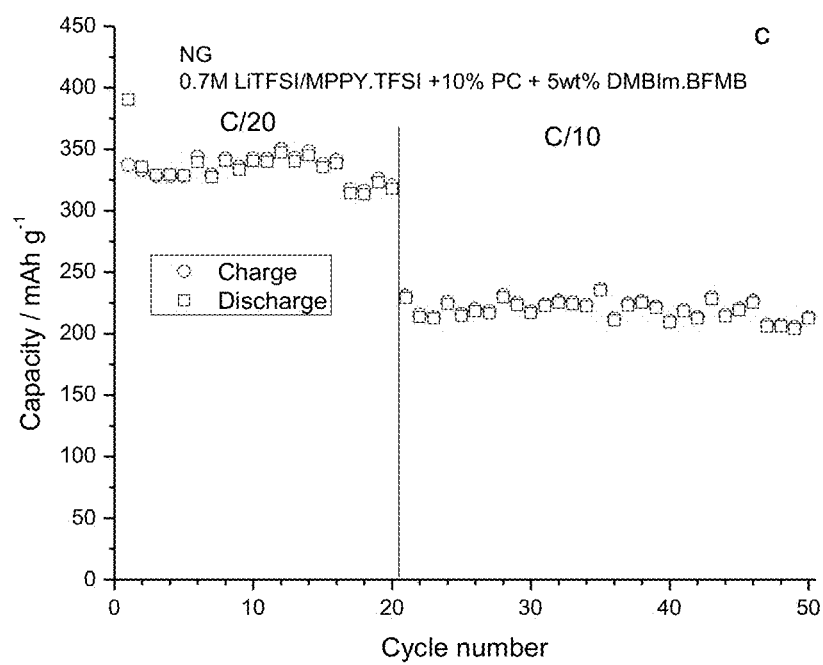

Finally, DMBIm.BFMB was added to an ionic liquid electrolyte based on 0.7M LiTFSI in methylpropylpyrrolidinium bis(trifluoromethanesulfonyl)imide (MPPY.TFSI), which is known to require additives to function in NG‖Li half-cells (Sun, X. G., et al., Electrochimica Acta, 2010, 55, 4618-4626). The cyclic voltammetry of 0.7M LITFSI/MPPY.TFSI, with and without additive, on a graphite working electrode is shown in FIG. 6A. For the pure ionic liquid electrolyte there is almost no distinguishable lithium de-intercalation that can be observed, while for the ionic liquid electrolyte with 5 wt % DMBIm.BFMB as additive and 10 wt % PC as co-solvent an enhanced lithium de-intercalation peak is clearly observed at the potential of 0.5V versus Li/Li$^+$. FIG. 6B compares the cycling performance of the NG‖Li half-cells based on 0.7M LiTFSI/MPPY.TFSI with and without additive. Under the current rate of C/20, a high capacity of 335 mAh g$^{-1}$ was obtained for the cell using additive while a low capacity of 50 mAh g$^{-1}$ was obtained for the cell without additive. FIG. 6C shows the rate capability of the NG‖Li half-cell using 0.7M LiTFSI/MPPY.TFSI with 5 wt % DMBIm.BFMB as additive and 10 wt % PC as co-solvent. Under the current rate of C/10 the reversible capacity is decreased to 225 mAh g$^{-1}$, which is mainly due to the high viscosity of the electrolyte.

In conclusion, it has herein been demonstrated that the newly developed boron-containing ionic liquids under Formula (10), as exemplified by DMBIm.BFMB, can be used as additives in lithium battery electrolytes, particularly pure PC based electrolytes, alkyl sulfone electrolyte, and ionic liquid electrolytes, to make them compatible with the graphite electrode. Moreover, these additives can improve the coulombic efficiency when used with high voltage cathode of LiNi$_{0.5}$Mn$_{1.5}$O$_4$.

While there have been shown and described what are at present considered the preferred embodiments of the invention, those skilled in the art may make various changes and modifications which remain within the scope of the invention defined by the appended claims.

What is claimed is:

1. An ionic liquid of the general formula Y$^+$T$^-$, wherein Y$^+$ is a positively-charged component of the ionic liquid and Z$^-$ is a negatively-charged component of the ionic liquid, wherein Z$^-$ has a composition of the following formula:

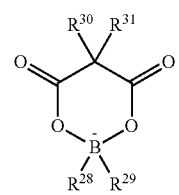

(10a)

wherein R$^{28}$, R$^{29}$, R$^{30}$, and R$^{31}$ are independently selected from H, F, hydrocarbon groups R attaching to the shown boron atom by a carbon atom, and alkoxy groups —OR, wherein at least one of R$^{30}$ and R$^{31}$ is F, and R$^{28}$ and R$^{29}$ can optionally interconnect to form a boron-containing ring;

provided that, if R$^{28}$ and R$^{29}$ interconnect, then the ionic liquid has the formula:

(10c-1)

wherein R$^{32}$ and R$^{33}$ are independently selected from H, F, hydrocarbon groups R, and alkoxy groups —OR, wherein at least one of R$^{32}$ and R$^{33}$ is F.

2. The ionic liquid of claim 1, wherein Z$^-$ has a composition of the following formula:

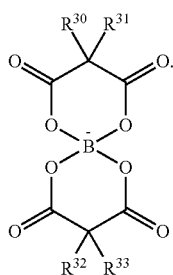

(10c-1)

3. The ionic liquid of claim 1, wherein $Y^+$ is an ammonium or phosphonium species.

4. The ionic liquid of claim 3, wherein $Y^+$ is an ammonium species.

5. The ionic liquid of claim 4, wherein $Y^+$ is comprised of a heterocyclic ring having a positively-charged ring nitrogen.

6. The ionic liquid of claim 5, wherein $Y^+$ is selected from imidazolium, benzimidazolium, pyridinium, pyrazinium, pyrrolidinium, piperidinium, piperazinium, morpholinium, pyrrolium, pyrazolium, pyrimidinium, triazolium, oxazolium, thiazolium, triazinium, indolium, quinolinium, quinazolinium, and cyclic guanidinium rings.

7. An electrolyte composition for a lithium ion battery, the electrolyte composition comprising:

a first ionic liquid of the general formula $Y^+Z^-$, wherein $Y^+$ is a positively-charged component of the ionic liquid and $Z^-$ is a negatively-charged component of the ionic liquid, wherein $Z^-$ has a composition of the following formula:

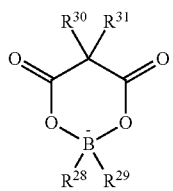

(10a)

wherein $R^{28}$, $R^{29}$, $R^{30}$, and $R^{31}$ are independently selected from H, F, hydrocarbon groups R attaching to the shown boron atom by a carbon atom, and alkoxy groups —OR, wherein at least one of $R^{30}$ and $R^{31}$ is F, and $R^{28}$ and $R^{29}$ can optionally interconnect to form a boron-containing ring, provided that, if $R^{28}$ and $R^{29}$ interconnect, then the ionic liquid has the formula:

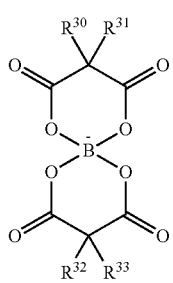

(10c-1)

wherein $R^{32}$ and $R^{33}$ are independently selected from H, F, hydrocarbon groups R, and alkoxy groups —OR, wherein at least one of $R^{32}$ and $R^{33}$ is F;

a second ionic liquid of the general formula $Y^+X^-$, wherein $Y^+$ is a positively-charged component of the ionic liquid and $X^-$ is a negatively-charged component of the ionic liquid, wherein $X^-$ does not have a formula according to Formula 10a; and a lithium salt.

8. An electrolyte composition for a lithium ion battery, the electrolyte composition comprised of:

an ionic liquid of the general formula $Y^+Z^-$, wherein $Y^+$ is a positively-charged component of the ionic liquid and $Z^-$ is a negatively-charged component of the ionic liquid, wherein $Z^-$ has a composition of the following formula:

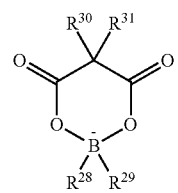

(10a)

wherein $R^{28}$, $R^{29}$, $R^{30}$, and $R^{31}$ are independently selected from H, F, hydrocarbon groups R attaching to the shown boron atom by a carbon atom, and alkoxy groups —OR, wherein at least one of $R^{30}$ and $R^{31}$ is F, and $R^{28}$ and $R^{29}$ can optionally interconnect to form a boron-containing ring;

provided that, if $R^{28}$ and $R^{29}$ interconnect, then the ionic liquid has the formula:

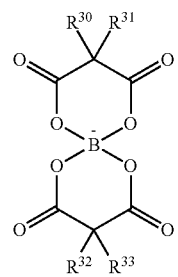

(10c-1)

wherein $R^{32}$ and $R^{33}$ are independently selected from H, F, hydrocarbon groups R, and alkoxy groups —OR, wherein at least one of $R^{32}$ and $R^{33}$ is F;

a non-ionic solvent; and a lithium salt.

9. The electrolyte composition of claim 8, wherein said non-ionic solvent is a sulfone or carbonate solvent.

10. The electrolyte composition of claim 8, further comprising a non-ionic solvent additive.

11. The electrolyte composition of claim 10, wherein said non-ionic solvent additive is a carbonate solvent additive.

12. The electrolyte composition of claim 10, wherein said non-ionic solvent additive is a sulfite solvent additive.

\* \* \* \* \*